Nov. 16, 1965 A. H. VEDVIK 3,217,766
HANDLING AND TRANSFER MECHANISM FOR SMALL ELONGATE ARTICLES
Filed Jan. 29, 1963 14 Sheets-Sheet 1
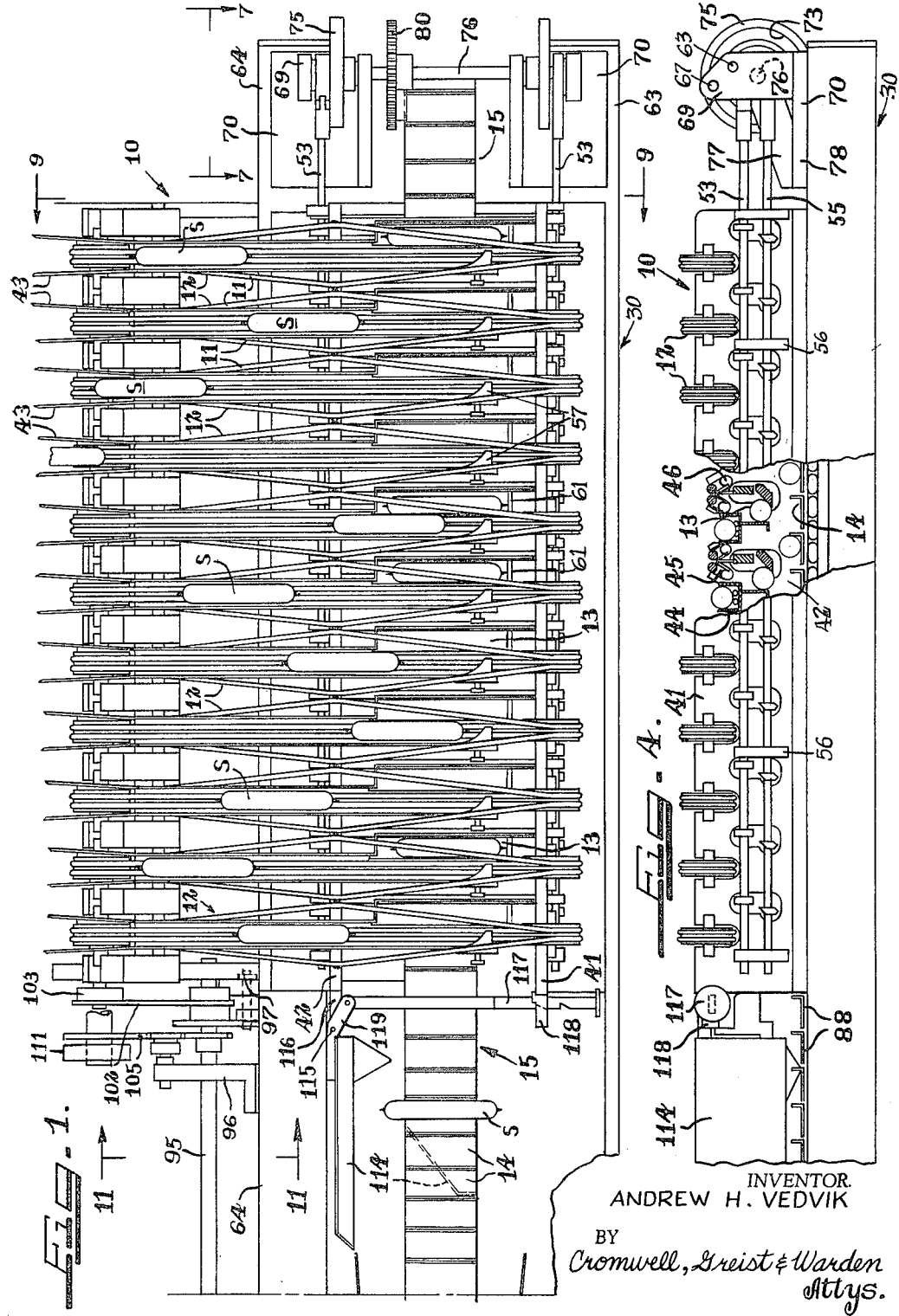
INVENTOR.
ANDREW H. VEDVIK
BY
Cromwell, Greist & Warden
Attys.

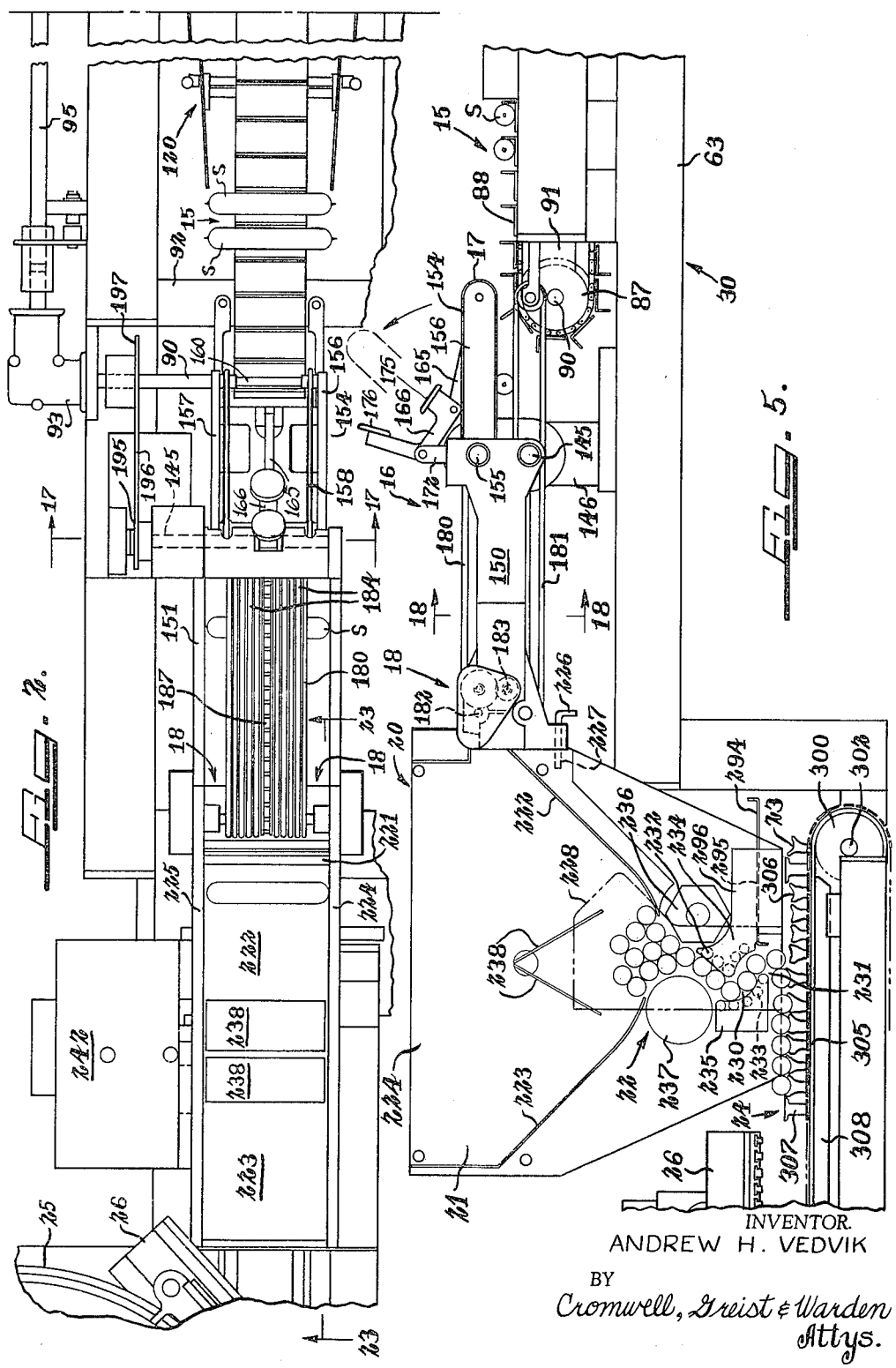

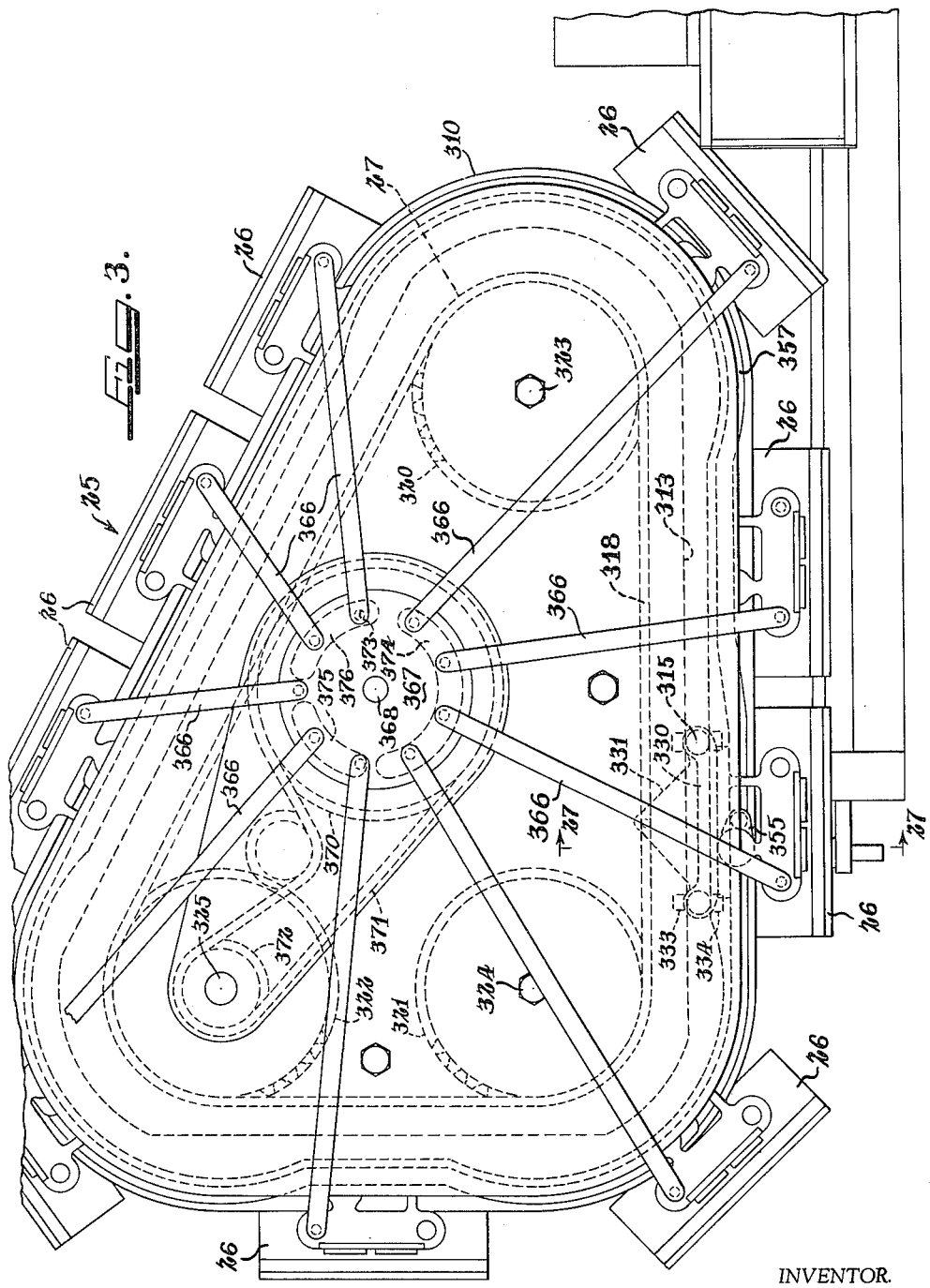

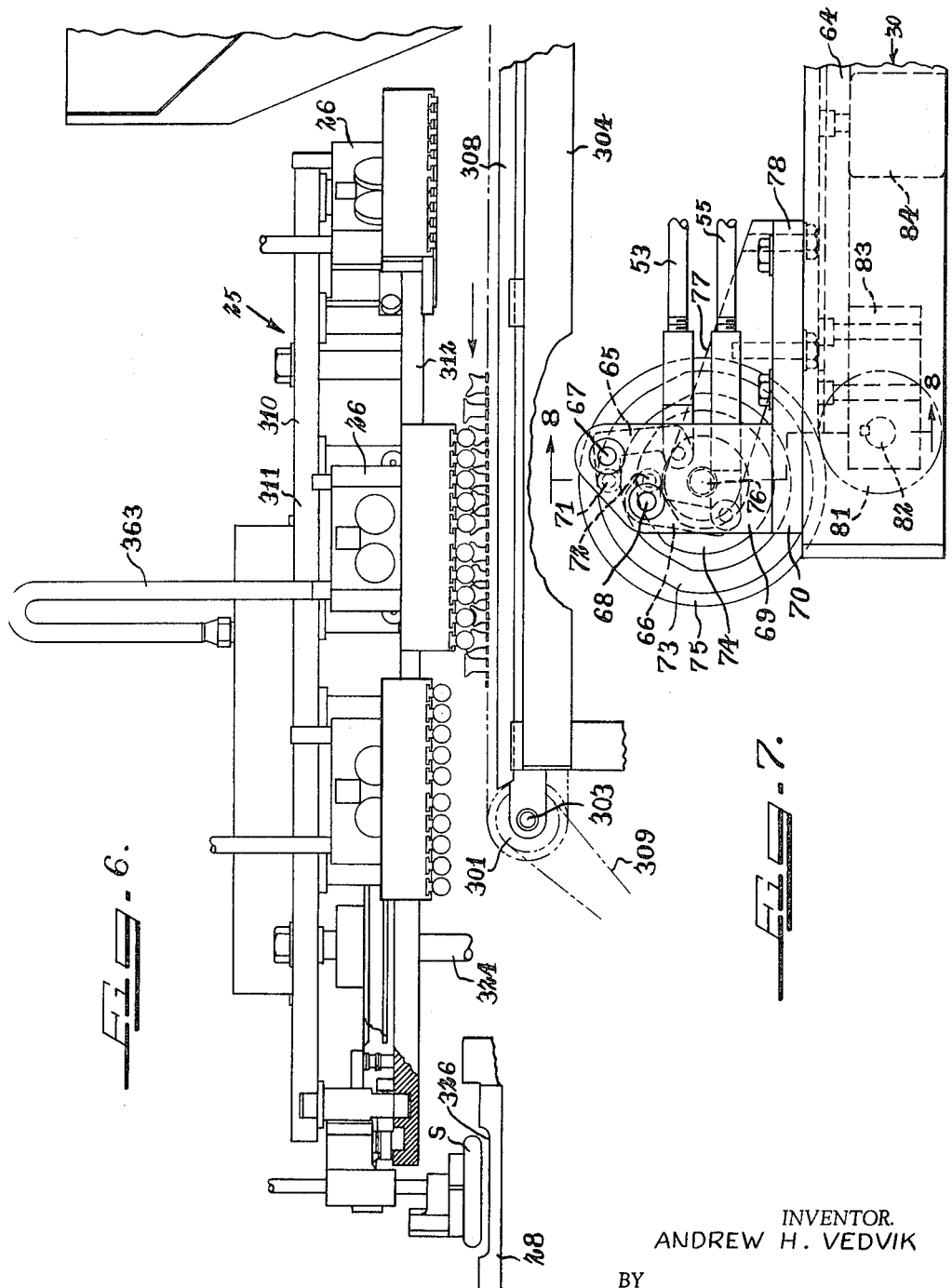

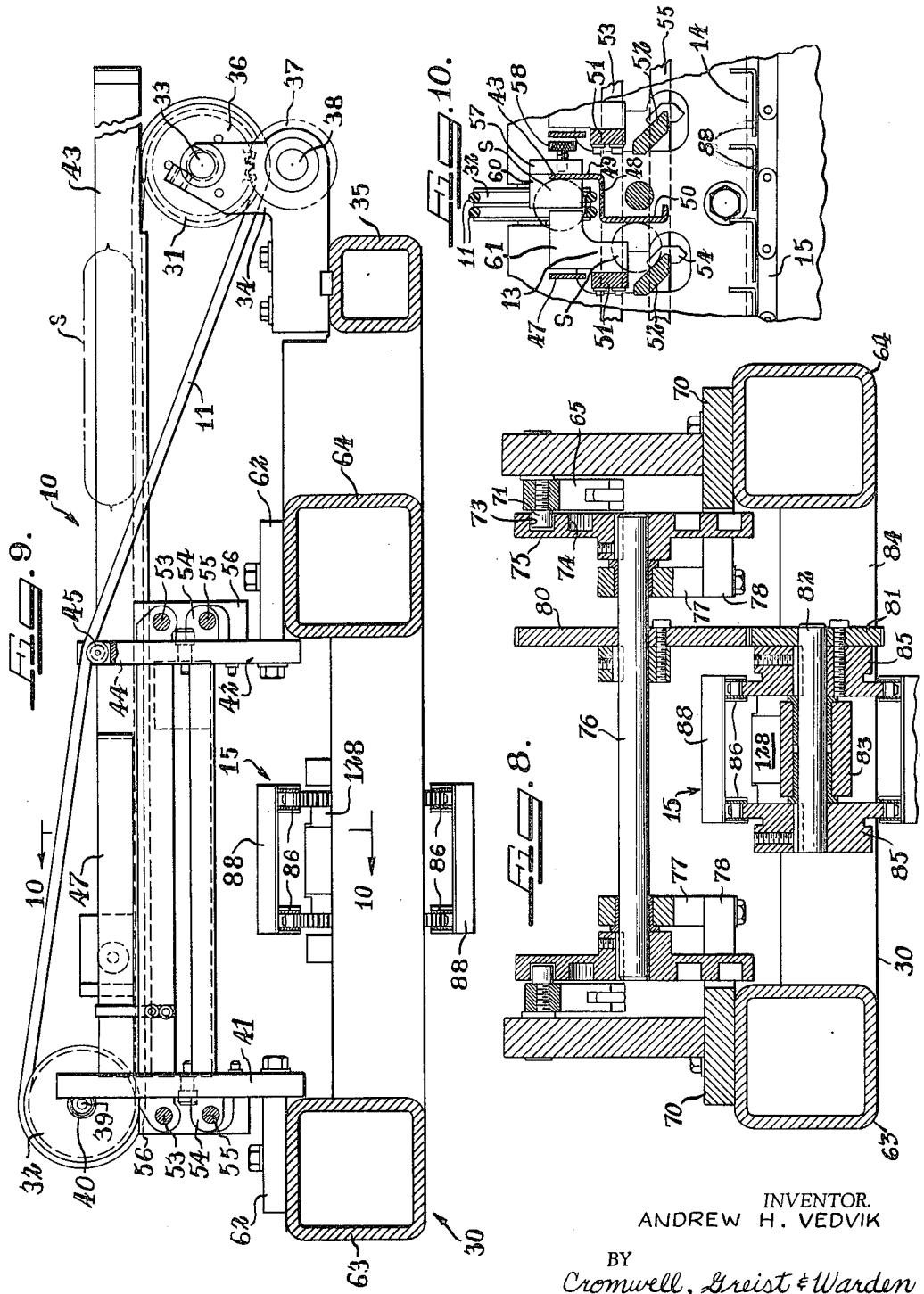

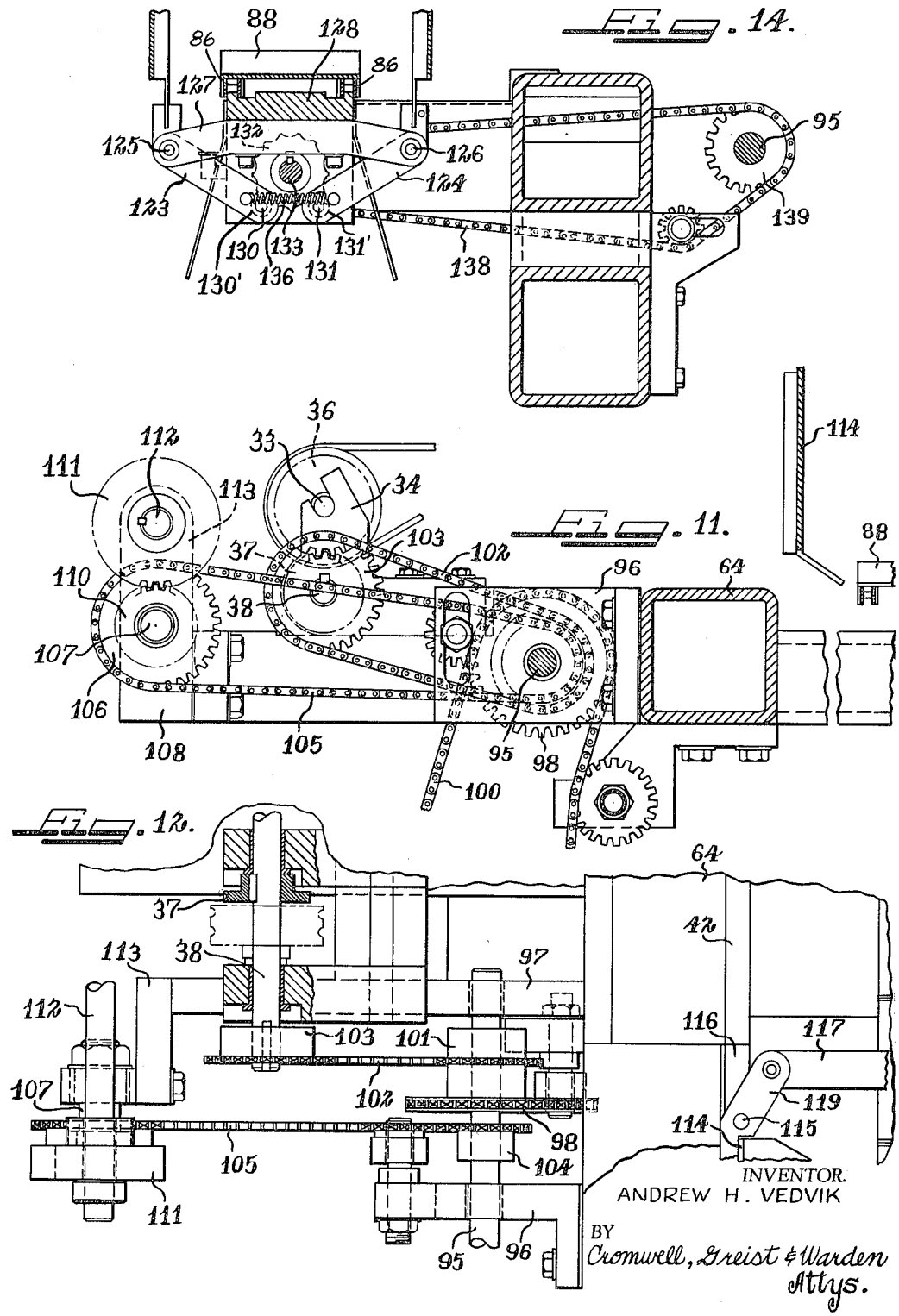

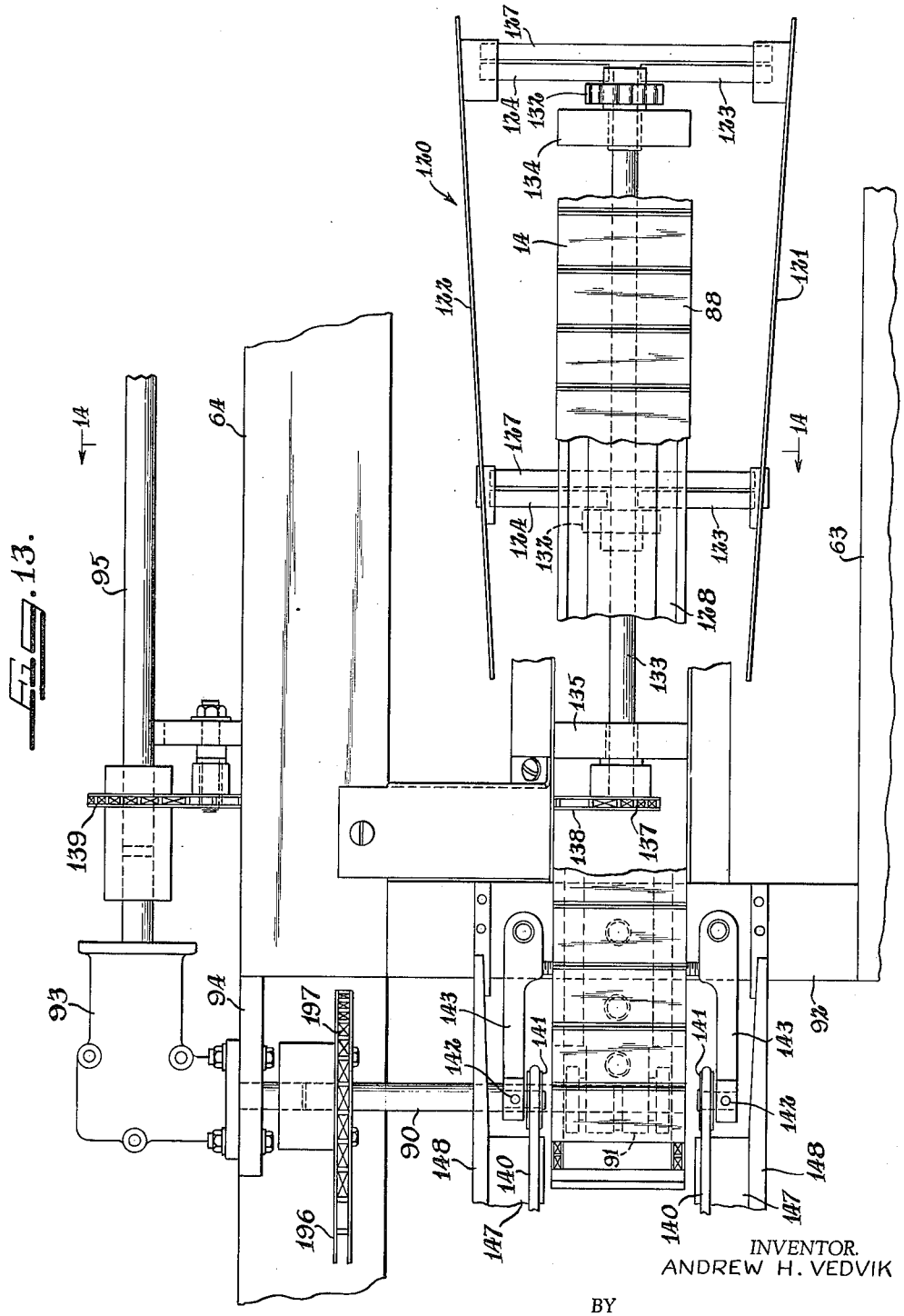

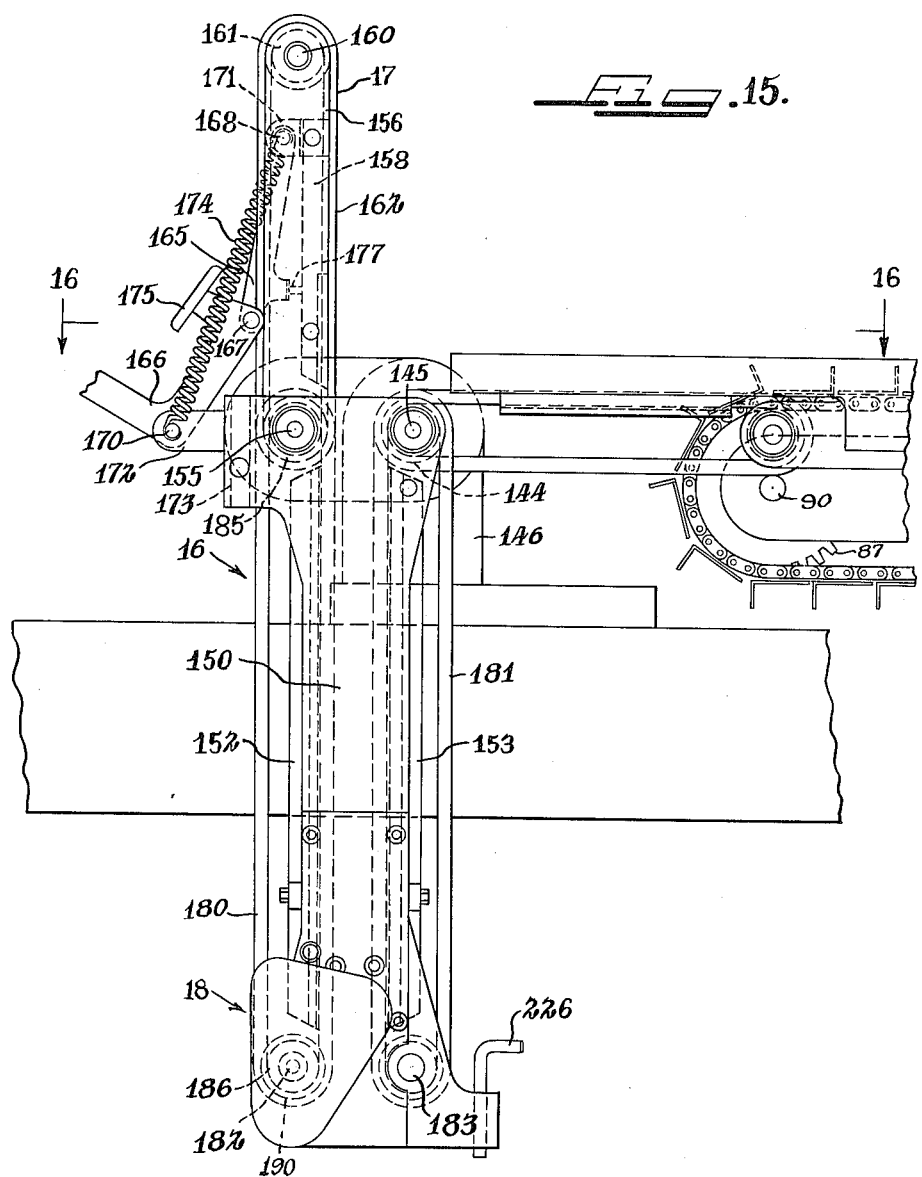

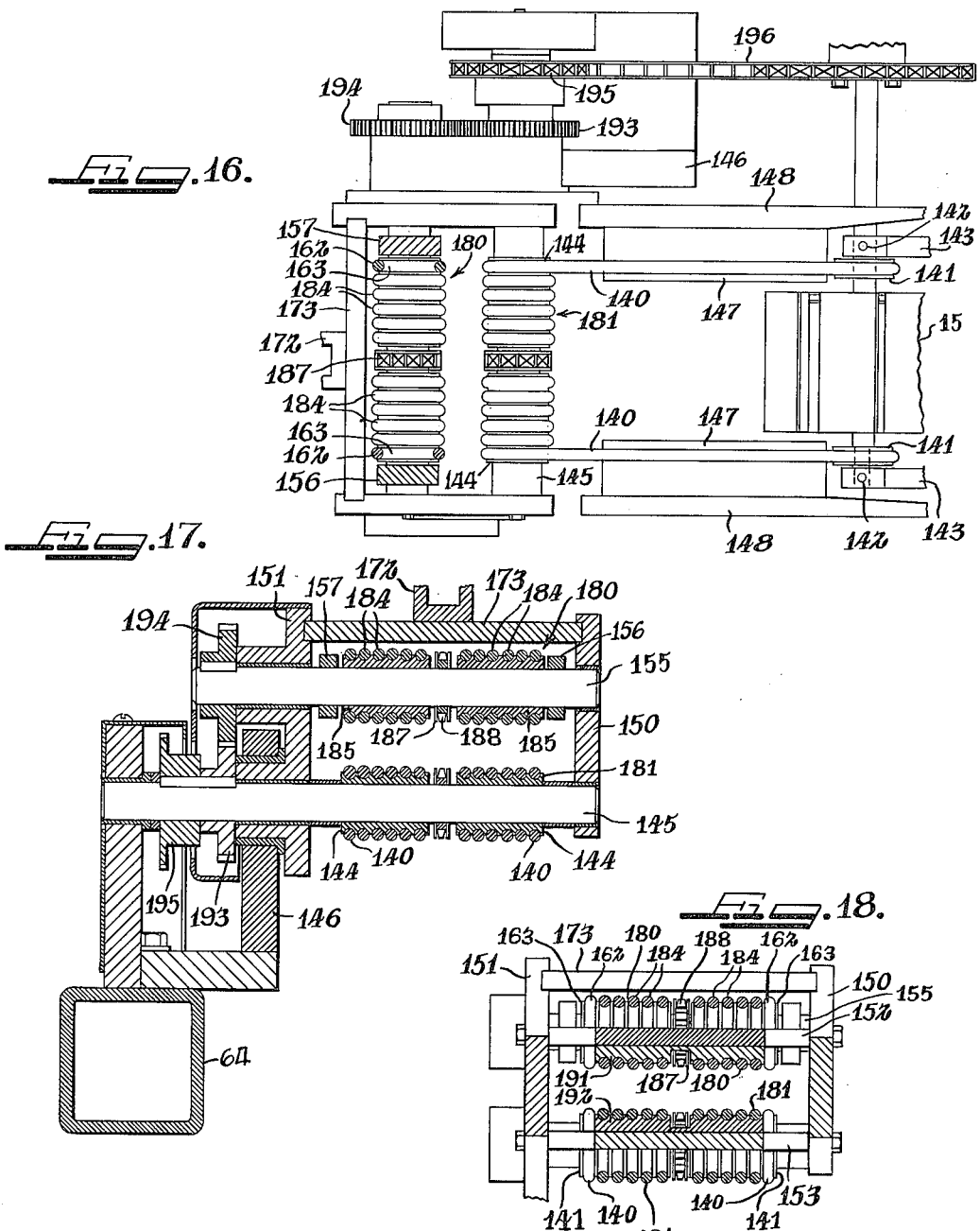

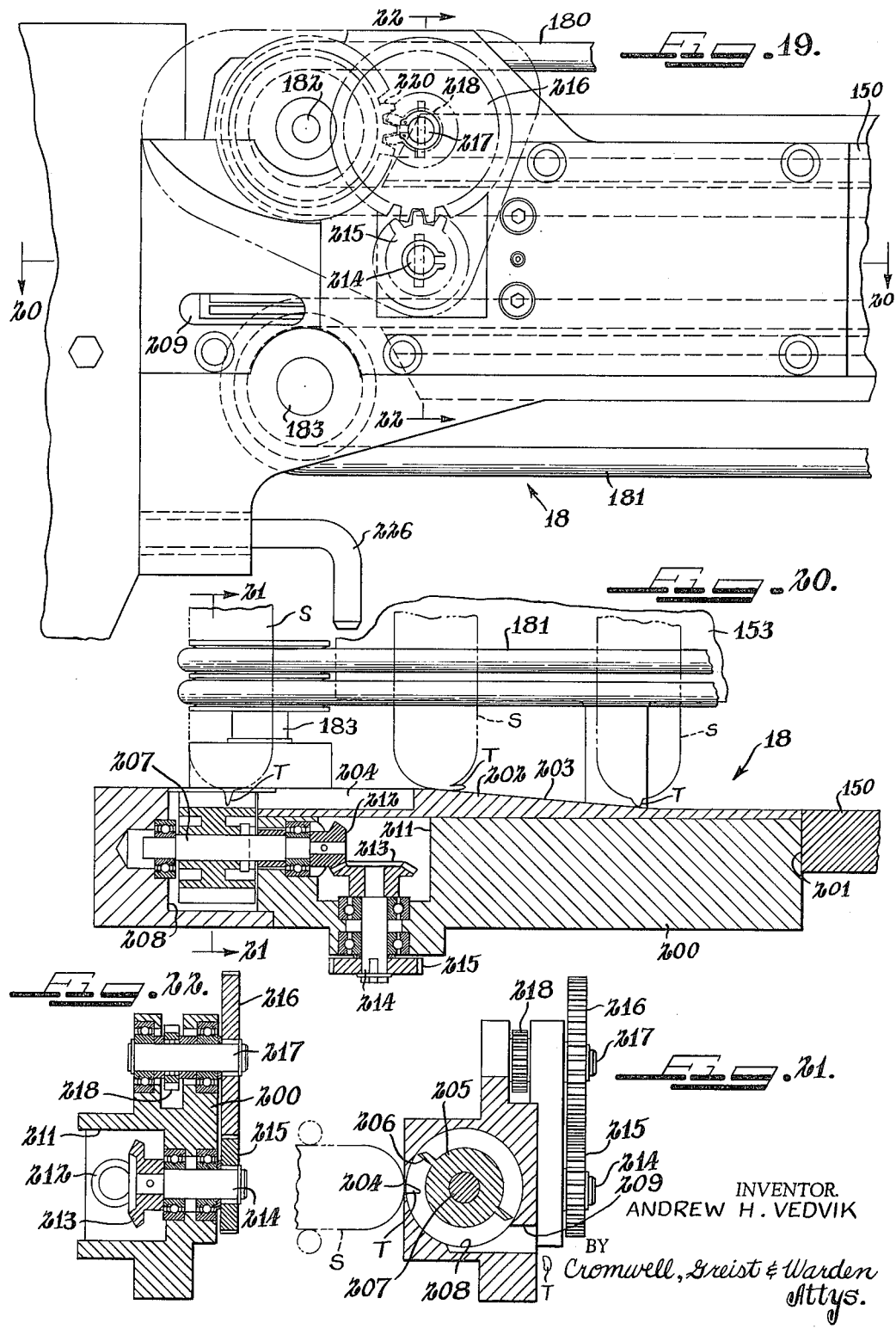

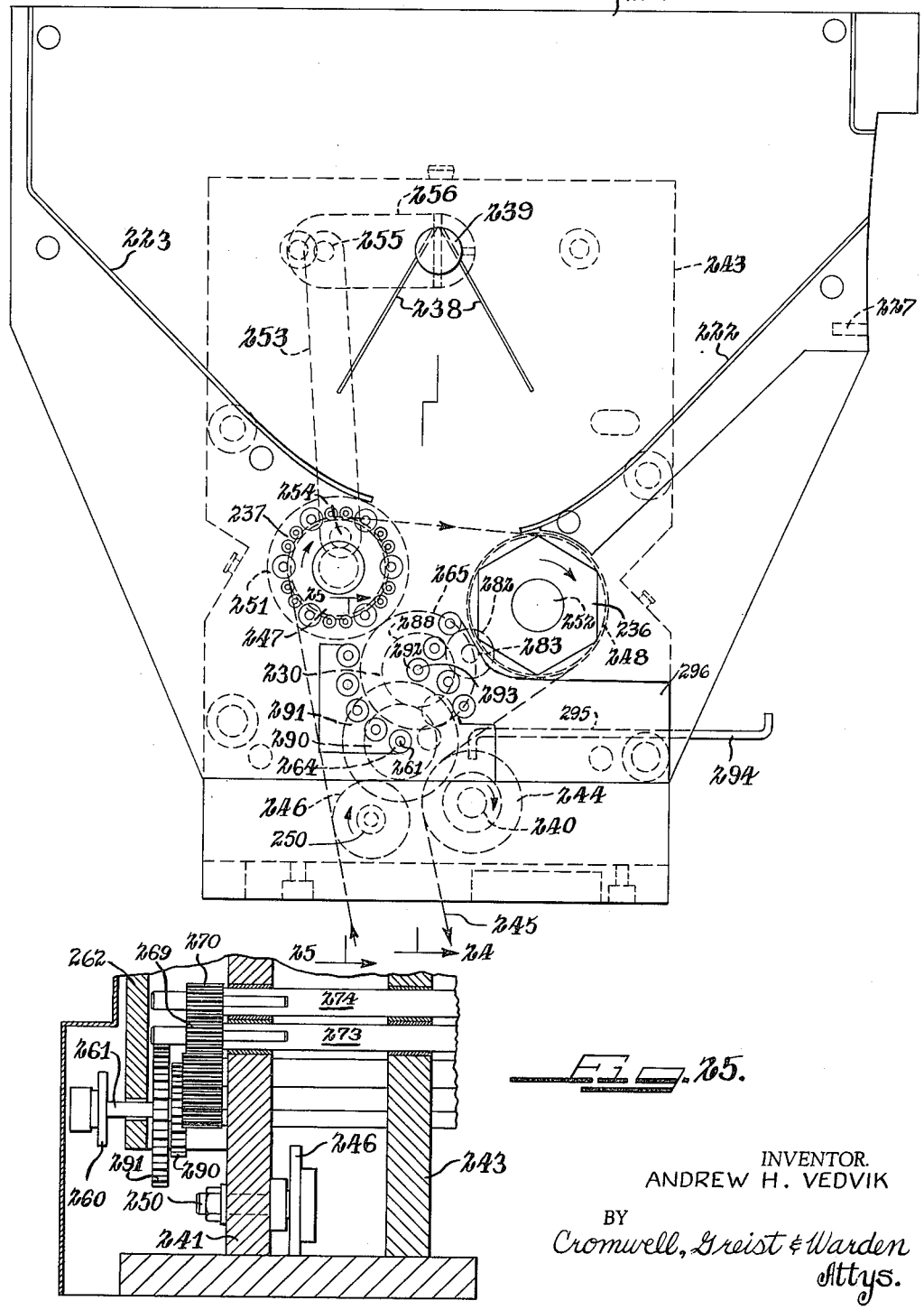

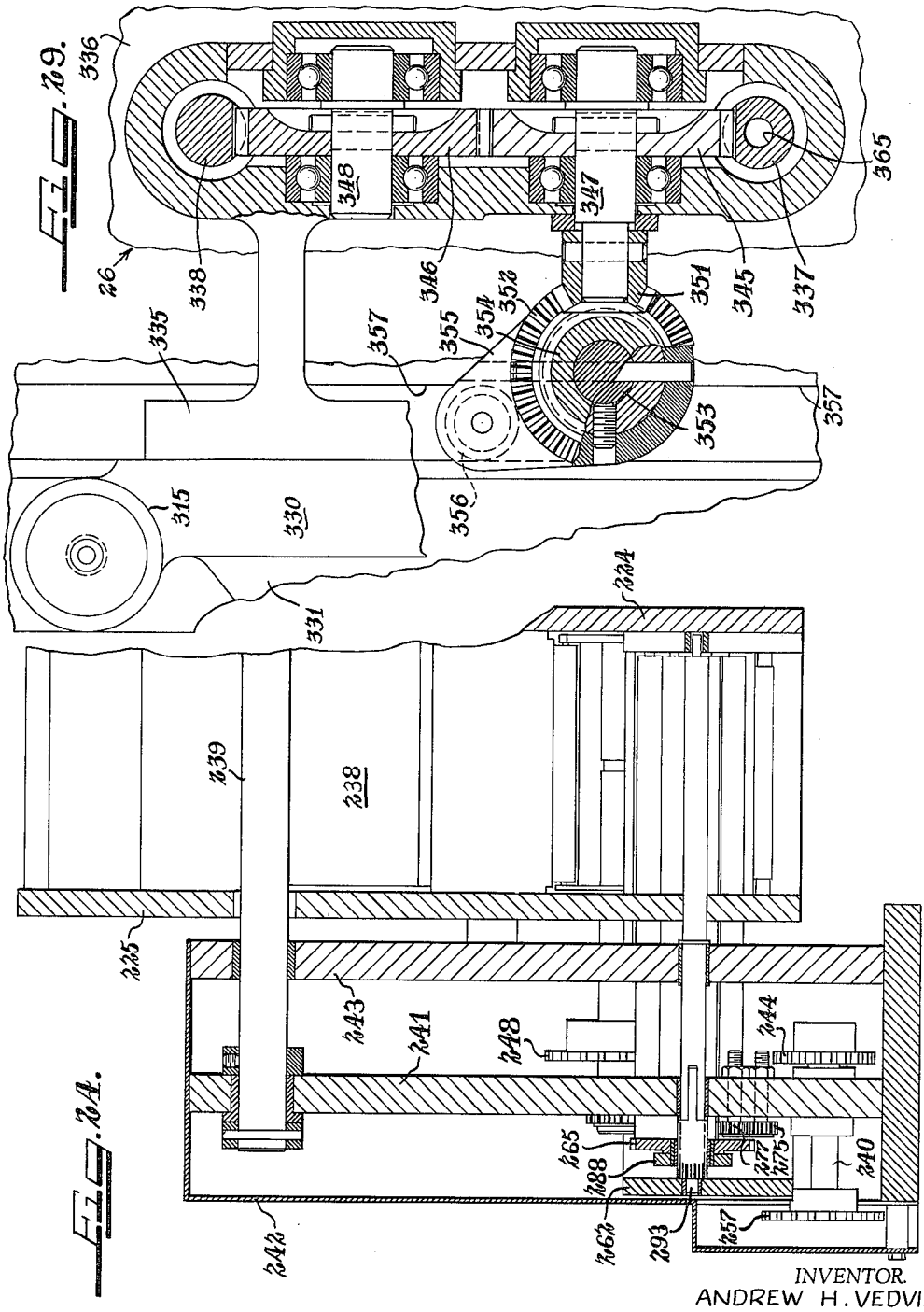

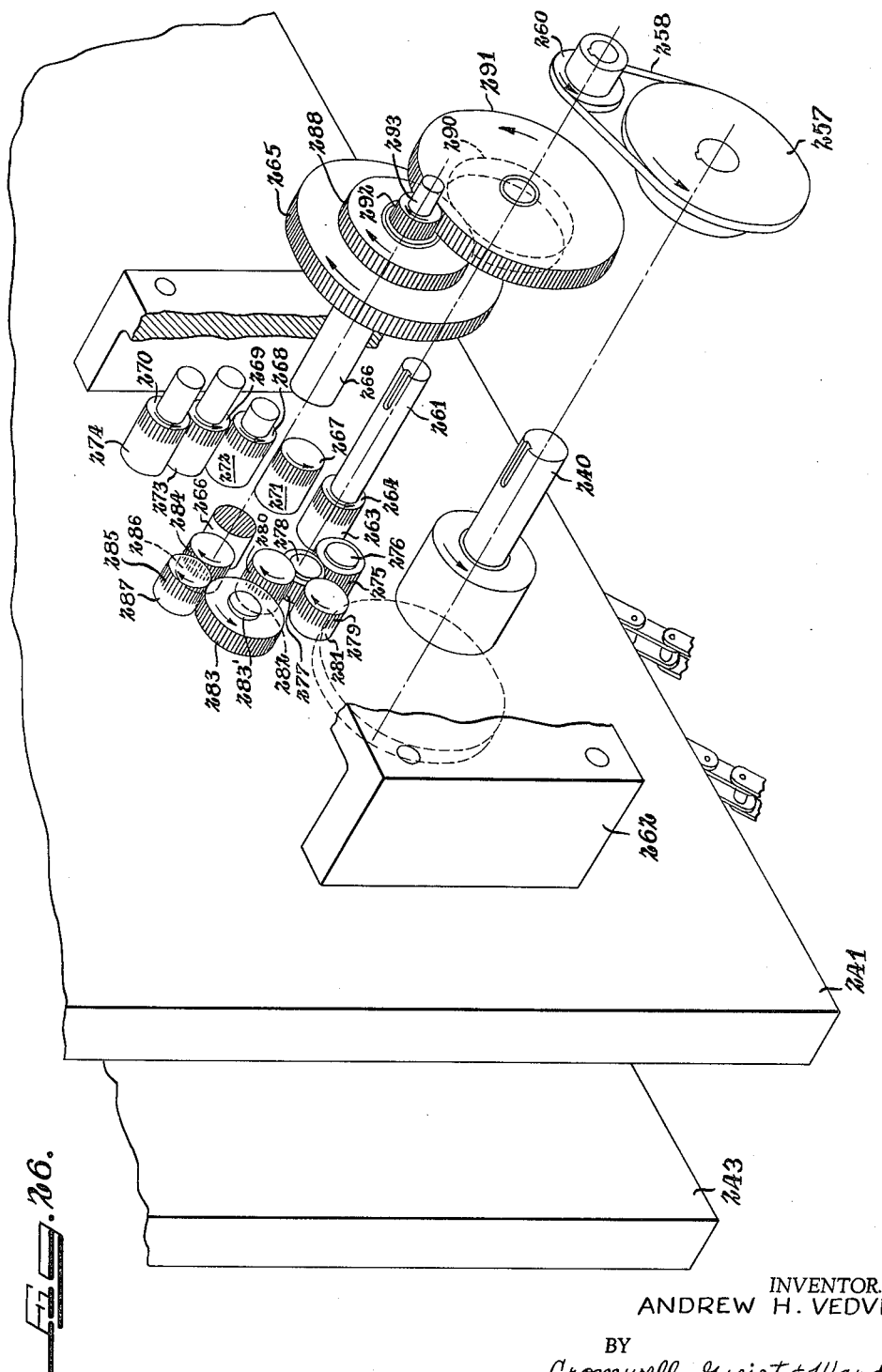

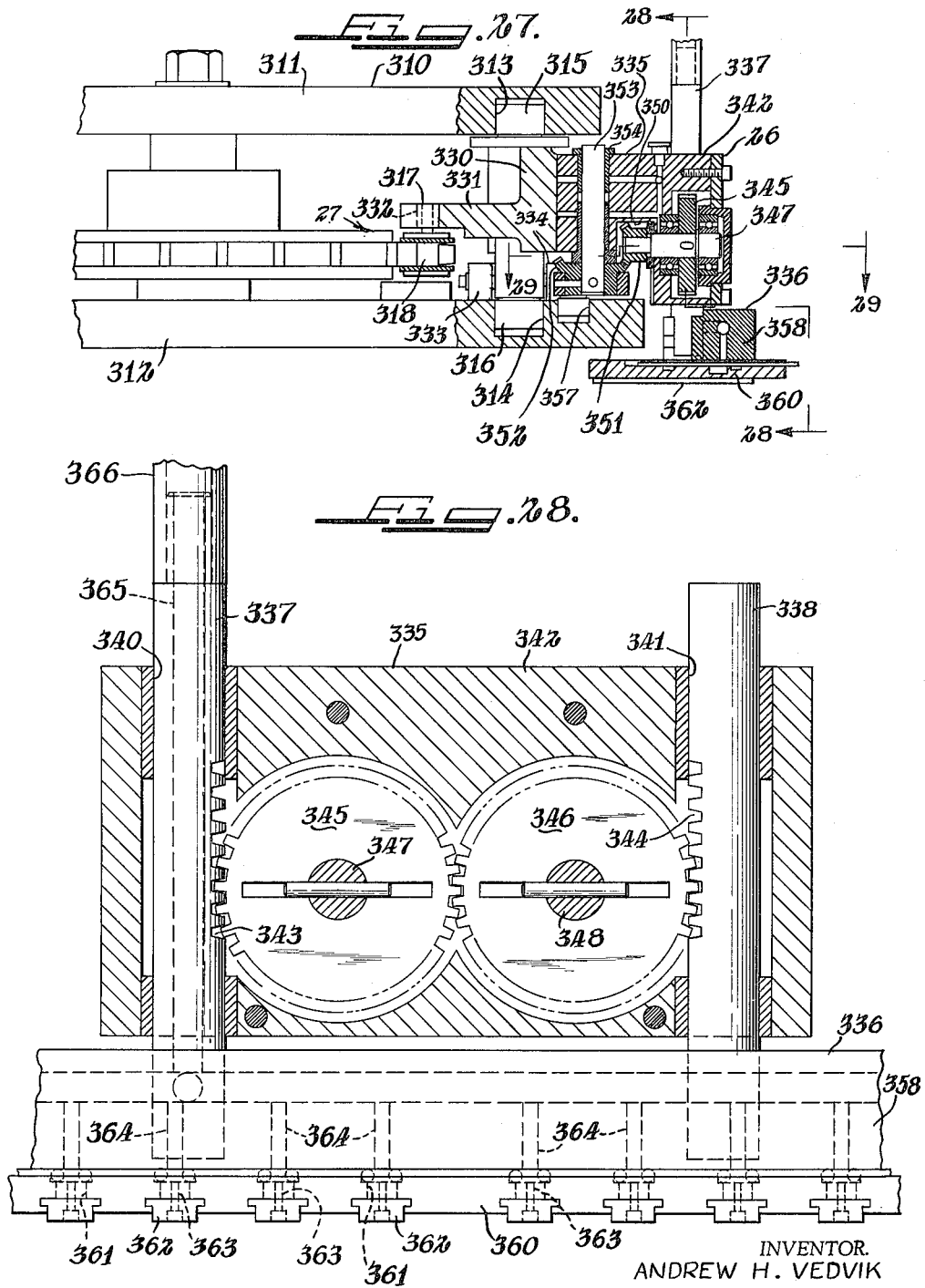

United States Patent Office 3,217,766
Patented Nov. 16, 1965

3,217,766
HANDLING AND TRANSFER MECHANISM FOR SMALL ELONGATE ARTICLES
Andrew H. Vedvik, Madison, Wis., assignor to Oscar Mayer & Co., Inc., Chicago, Ill., a corporation of Illinois
Filed Jan. 29, 1963, Ser. No. 254,745
20 Claims. (Cl. 146—81)

This invention relates to article handling equipment and is more particularly concerned with improvements in apparatus for receiving elongated, generally cylindrical articles which are advancing in the direction of their long axes and in one or more parallel lanes for transferring the articles to a single lane conveyor which transports them to accumulator, for arranging the articles in spaced groups, and for delivering the groups to a wrapping machine or other handling equipment.

It is a general object of the invention to provide article handling and transporting apparatus which receives elongated cylindrical articles, such as sausages which are oriented in a longitudinal direction, which deposits the articles on a transverse conveyor leading to an accumulator where the articles are distributed in an orderly manner and at a uniform rate on a grouping conveyor from which the articles are picked up in predetermined groups and/or quantities and deposited on an infeed conveyor for a packaging machine or the like.

It is a more specific object of the invention to provide an apparatus for transporting and arranging articles such as link sausages wherein the sausages are received as they are advanced at a varying rate and oriented in a longitudinal direction, from a processing apparatus or the like, and deposited in a transverse conveyor on which they are conveyed to an accumulator, the latter discharging the sausages in an orderly manner and at a uniform rate onto another conveyor from which the sausages are picked up in groups of a predetermined number and transported to a wrapping station where they are deposited in the arrangement and number required for forming uniform packages of the same.

A still more specific object of the invention is to provide apparatus for handling elongated cylindrical articles, for example, link sausages which have been freed from the casings in which they are processed and which are advanced to the apparatus in multiple lane and longitudinal arrangement, the apparatus comprising an endless belt conveyor which delivers the sausages into compartments above a transverse conveyor, the compartments having movable exit gates which are synchronized to open in timed relation to the movement of a constant speed conveyor below the same so as to drop the sausages into pockets in the transverse conveyor, the transverse conveyor having mechanism for aligning the sausages on the conveyor as the transverse conveyor advances the sausages to an accumulator device comprising a hopper into which the sausages are delivered and a mechanism in the bottom of the hopper for delivering the sausages in an orderly manner into the pockets of another conveyor which advances the sausages in group formation to pick-up devices which lift the sausages from the group conveyor and convey them in the desired group arrangement to the infeed conveyor for a wrapping machine.

Another object of the invention is to provide in an apparatus for handling sausages or like articles which are delivered from a processing apparatus in a plurality of lines at a varying rate and oriented in a longitudinal direction a forwarding conveyor which deposits the sausages in compartments beneath the delivery end thereof, each of the compartments being of a size to hold two of the sausages one above the other and having a movable discharge gate synchronized to open in time to drop the lowermost sausage into a pocket on a constant speed conveyor operating in a transverse path below the compartments.

A further object of the invention is to provide in an apparatus of the type described a traveling belt conveyor and sausage holding compartments arranged at the discharge end of the conveyor wherein each compartment is provided with a movable discharge gate and a movable stop which are operated so as to prevent a sausage which is not in proper position from entering into the lower part of the compartment while permitting a properly positioned sausage to pass into the compartment and thereafter drop into a pocket on a transverse conveyor below the same.

A further object of the invention is to provide an apparatus of the type described comprising a belt conveyor for delivering sausages into compartments at one end of the same, and a transverse conveyor which receives the sausages from the compartments at the end of the belt, which transverse conveyor has associated therewith a centering device for arranging all of the sausages delivered thereto in uniform centered single lane relation thereon.

It is another object of the invention to provide in an apparatus of the type described a sausage link accumulator which receives the sausage links from a conveyor operating at a non-uniform delivery rate and maintains an accumulation of the links, with provision for feeding the links out of the accumulator and onto a grouping conveyor in a uniform manner, the accumulator having mechanism for arranging the links in side-by-side relation and depositing the same in pockets on the grouping conveyor, with the accumulator delivering a continuous steam of the sausages so long as a supply thereof is maintained in the accumulator.

It is a still further object of the invention to provide in an apparatus of the type described a transfer mechanism which comprises a conveyor having a series of vacuum heads thereon which travel in a path outboard of the path of the conveyor and which are provided with individual vacuum pick-up means for picking up the required number of sausages to make up the desired group and which transfers the groups from the grouping conveyor to pockets on an infeed conveyor of a packaging machine or the like.

These and other objects and advantages of the invention will be apparent from a description of the apparatus which is shown by way of illustration in the accompanying drawings wherein:

FIGURE 1 is a plan view with portions broken away of the receiving or entrance end of apparatus for transporting small sausages from processing equipment to a wrapping machine which apparatus embodies therein the principles of the invention;

FIGURE 2 is a plan view, with portions broken away, of the intermediate portion of the apparatus showing portions of a transverse conveyor and an accumulator mechanism;

FIGURE 3 is a plan view with portions broken away at the discharge or exit end of the apparatus showing a group transfer mechanism for delivering the sausages in groups to an infeed conveyor of a wrapping machine;

FIGURE 4 is a side elevation of the apparatus shown in FIGURE 1;

FIGURE 5 is a side elevation of the apparatus shown in FIGURE 2;

FIGURE 6 is a side elevation of the apparatus shown in FIGURE 3;

FIGURE 7 is a cross section taken on the line 7—7 of FIGURE 1 to an enlarged scale;

FIGURE 8 is a cross section taken on the line 8—8 of FIGURE 7;

FIGURE 9 is a sectional view taken on the line 9—9 of FIGURE 1 to an enlarged scale;

FIGURE 10 is a section taken on the line 10—10 of FIGURE 9;

FIGURE 11 is a cross section taken on the line 11—11 of FIGURE 1 to an enlarged scale;

FIGURE 12 is a fragmentary plan view, on an enlarged scale, of portions of the mechanism shown in FIGURE 1;

FIGURE 13 is a fragmentary plan view, on an enlarged scale and with portions broken away, of a part of the mechanism shown in FIGURE 2;

FIGURE 14 is a cross section taken on the line 14—14 of FIGURE 13;

FIGURE 15 is a side elevation, on an enlarged scale, of a portion of the mechanism shown in FIGURE 5, with parts thereof in an inoperative position;

FIGURE 16 is a section taken on the line 16—16 of FIGURE 15;

FIGURE 17 is a cross section taken on the line 17—17 of FIGURE 2, to an enlarged scale;

FIGURE 18 is a cross section taken on the line 18—18 of FIGURE 5, to an enlarged scale;

FIGURE 19 is an elevation on an enlarged scale of a portion of the apparatus shown in FIGURE 5;

FIGURES 20 is a cross section taken on the line 20—20 of FIGURE 19;

FIGURE 21 is a cross section taken on the line 21—21 of FIGURE 20;

FIGURE 22 is a cross section taken on the line 22—22 of FIGURE 19;

FIGURE 23 is a section taken on line 23—23 of FIGURE 2 to an enlarged scale;

FIGURE 24 is a vertical section taken on the line 24—24 of FIGURE 23;

FIGURE 25 is a fragmentary vertical section taken on the line 25—25 of FIGURE 23;

FIGURE 26 is a schematic view illustrating the driving arrangement for the accumulator device;

FIGURE 27 is a vertical section taken on the line 27—27 of FIGURE 3, to an enlarged scale;

FIGURE 28 is a fragmentary section taken on the line 28—28 of FIGURE 3, to an enlarged scale; and FIGURE 29 is a fragmentary section taken on the line 29—29 of FIGURE 27.

Referring to the drawings, the apparatus illustrated is especially designed for use in a sausage manufacturing or processing operation where link sausages are delivered to the apparatus from casing stripping mechanisms in a plurality of parallel paths with the individual sausages advancing in the direction of their long axes and in a non-uniform or miscellaneous array. The apparatus comprises a sausage link receiving and transporting conveyor 10 (FIGURES 1 and 4) which has a plurality of pairs of endless traveling belts 11, with each pair thereof arranged to form a conveyor unit 12 for receiving successive sausage links S which are advancing in a single one of the paths. The belt conveyor units 12 which are arranged in parallel relation on an upright supporting frame structure advance the sausages S in a generally horizontal plane to a series of transversely spaced compartments or passageways 13 through which the sausages are passed to pockets 14 arranged in parallel relation on the upper horizontal run of a transversely extending conveyor 15 which is operated at a constant speed and advances the sausages S, arranged in single row, side-by-side formation, to an in line conveyor mechanism 16 (FIGURES 2 and 5). The conveyor mechanism 16 has a section 17 which may be tilted upwardly on a transverse pivot to provide access to the sausages advancing from the end of the conveyor 15 and permit any jamming to be cleared. The entire conveyor mechanism 16 may be pivoted downwardly for diverting the flow of sausages to a vertical path and into a collecting device (not shown) when it is desired to stop the delivery of sausages to the accumulator for any reason such as a breakdown in the mechanism beyond this point. The conveyor 16 also has associated with it mechanisms 18 for trimming the tips T (FIGURE 21) which remain on the ends of the sausages when they are stripped from the casing (not shown) in which they are formed following the processing or cooking and smoking of the same. The conveyor 16 extends to an accumulator mechanism 20 having a hopper 21 into which the sausages are delivered by the conveyor 16 and a roller assembly 22 for arranging the sausages in a single line and discharging the same in a constant stream through the bottom of the hopper 21. The sausages are deposited in groups of a predetermined number in the pocket forming members 23 on the horizontally disposed top run of a conveyor 24 which advances the groups of sausages to a pick-up station below a group transfer device 25 (FIGURES 3 and 6). The group transfer device 25 comprises a plurality of pick-up heads 26 mounted on an endless chain conveyor 27 which is guided in a horizontal path having adjoining sections thereof extending at right angles to each other and the pick-up heads 26 are operated to pick up successive groups of sausages from the conveyor 24 and deposit the same in the pockets on an infeed conveyor 28 of a wrapping machine (not shown) whereby the sausages are transferred automatically from the processing lines, assembled into groups and delivered to a packaging or wrapping machine.

The conveyor 10 at the receiving or infeed end of the apparatus is arranged in a generally horizontal plane on an upright supporting frame 30 (FIGURES 1, 4 and 7 to 10) and receives the sausages S which are advanced thereto in a plurality of lines with the sausages in each line being spaced more or less uniformly depending upon the operation of the casing stripping devices and with each line of sausages being fed to a pair of belts 11 of a conveyor unit 12 on the conveyor 10. Each belt conveyor unit 12 comprises a pair of endless traveling belts 11 which are carried at their opposite ends on pairs of supporting pulleys 31 and 32. The belts 11 are of rubber or similar material and are in the form of O-rings having a relatively small circular cross section. Each pair of end pulleys 31 (FIGURE 9) are mounted on a short shaft 33 supported in the bifurcated upwardly extending leg of an angular bearing forming bracket 34, the latter being secured on the top of beam 35 forming part of the upright supporting frame 30. Each shaft 33 carries a gear 36 which is driven by a cooperating gear 37 on a drive shaft 38 extending beneath the pulleys 31. The end supporting pulleys 32 at the other end of each conveyor unit 12 are mounted on a small shaft 39 which is supported in bearing forming members 40 mounted adjacent the upper edge of the forward plate 41 of a pair of laterally spaced, vertically extending, parallel support plates 41 and 42. The belt support pulleys 31 and 32 are mounted at different elevations so that one run of the belts 11 on which the sausages are advanced extends from the top of pulleys 31 to the bottom of pulleys 32 and is carried in a generally horizontal plane within an upwardly opening guide channel member 43 which is of generally U-shaped cross section and which extends between the pulleys 31 and 32 and is secured in a slot 44 in the support plate 42. The return run of each belt 11 of each pair thereof extends from the top side of the pulleys 32 over a guide pulley or grooved roller 45 and down to the bottom side of the pulleys 31. The guide pulleys 45 are mounted in inclined position in slots 46 (FIGURE 4) in the top edge of the vertical support plate 42 with the guide pulleys 45 for the belts 11 of each pair thereof being on opposite sides of the slot 44 and the guide channel 43 which carries the sausage advancing runs of the pair of belts so that the return runs of each pair of belts 11 of each conveyor unit 12 are spread in diverging relation as they travel between the end support pulleys 32 and the guide pulleys 45 and then converge as they travel from the guide pulleys 45 to the end support pulleys 31. At the entrance end of the guide channel 43 (FIGURE 1) the side walls thereof are spread apart somewhat and the bottom wall is cut out to accommodate the belts 11. At the discharge end of the guide channel 43 the one side wall 47 (FIGURES 1 and 10) is freed from the bottom wall 48 and the opposite side wall 49 and offset a distance sufficient to provide an opening for passage of a sausage between the edge of the bottom wall 48 and the side wall 47. An apron 50 depends from the edge of the bottom wall 48 which is parallel with the outwardly offset side wall 47 and extends below the same. A pair of parallel bars 51 and 52 are disposed opposite the outer face of the apron 50. The uppermost bar 51 has a vertical face thereof disposed opposite the upper portion of the vertical face of the apron 50 and is mounted at its opposite ends on spaced, parallel slide rods 53. The lowermost bar 52 has an inclined face disposed opposite the lower portion of the apron 50 with its opposite ends mounted by means of brackets 54 on spaced slide rods 55. The slide rods 53 and 55 are mounted for sliding movement in parallel relation on the outside faces of the vertically disposed frame plates 41 and 42 by means of bearing brackets 56 which are spaced longitudinally of the plates 41 and 42. As shown in FIGURE 10, the bars 51 and 52 are normally positioned to permit a sausage S to roll off of the belts 11 into the compartment-like enclosure or passageway 13 formed between the apron 50 and the bars 51 and 52. A sausage diverter block 57 is adjustably mounted by means of screw 58 on the vertical wall 49 of the guideway member 43 immediately above the belts 11 so that a sausage link being advanced by the belts 11 strikes a curved surface 60 of the block 57 and rolls off the side of the belts 11 and down into the compartment of pocket 13 at one side of the same. An end stop plate 61 is mounted on the top bar 51 which cooperates with the diverter block 57 to limit the forward movement of the sausage.

The side plates 41 and 42 which support the guide channels 43 and associated elements are mounted by means of brackets 62 on parallel lateral beams 63 and 64 forming part of the main support frame 30 and the beam members 63 and 64 are extended at one end to support a mechanism for reciprocating the slide rods 53 and 55. The slide rods 53 and 55 on each of the support plates 41 and 42 are pivotally connected at the trailing ends thereof to the lower ends of the long arms of a pair of bell cranks 65 and 66 (FIGURES 4, 7 and 8). The bell cranks 65 and 66 of each pair thereof are pivoted at 67 and 68 on an upright plate portion 69 of an upstanding bearing bracket 70 and the bearing brackets 70 mounted on the extended ends of the beam forming members 63 and 64. The bell cranks 65 and 66 carry on their short upper arms cam rollers 71 and 72 which engage in cam tracks 73 and 74 in a cam plate 75 which is mounted for rotation on a cross shaft 76 journaled in spaced bearing forming members 77 extending upwardly from inner portions 78 of the bracket members 70. A gear 80 is mounted on the cross shaft 76 which is driven by a pinion 81 carried on the end of the cross shaft 82 which is journaled in a bearing forming bracket 83 extending from a cross beam 84 of the main frame 30 and which carries a pair of sprockets 85 forming the end support for the conveyor 15.

The conveyor 15 (FIGURES 1, 2, 4, 5 and 13) comprises a pair of parallel chains 86 carried at one end on the sprockets 85 and at the other end on a pair of sprockets 87. Two chains 86 are connected by a series of plate members 88 having an L-shaped cross section and mounted on the chains 86 to provide pockets 14 for receiving the sausages in side-by-side relation. The conveyor sprockets 87 at the leading end of the conveyor 15 are mounted on the end of a transverse drive shaft 90 and on opposite sides of a bearing forming frame member 91, the latter being secured to a cross beam 92 forming part of the frame 30. The drive shaft 90 extends to a right angle drive connection in a housing 93 supported on an upstanding bracket plate 94 on frame member 64. The shaft 90 is connected in driven relation with the drive shaft 95 which extends into the housing 93 at the one end and is journaled in bracket plates 96 and 97 (FIGURES 1, 11 and 12) at the other end, both of which extend from the support beam 64. The shaft 95 carries a sprocket 98 which is connected by the chain 100 (FIGURE 11) to a suitable power source (not shown). A sprocket 101 on the end of the shaft 95 is connected by a chain 102 with a sprocket 103 on the drive shaft 38 for the belt pulleys 31 (FIGURE 9). The shaft 38 carries the axially spaced gears 37 which engage with the gears 36 on the support shafts 34 which carry the end support pulleys 31 for the belts 11 of the belt conveyor units 12. The shaft 95 also carries the sprocket 104 which is connected by the drive chain 105 with a sprocket 106 on a stub shaft 107 journaled in the support bracket 108. The shaft 107 carries a gear 110 which engages with gear 111 on the drive shaft 112, the latter being journaled in support bracket 113 and constituting the power shaft for the processing apparatus from which the sausages are delivered to the present apparatus.

An apparatus is provided for clearing a portion of the conveyor 15 of sausages as the conveyor 15 emerges from beneath the conveyor 10 or for diverting sausages on the conveyor 15 so that they are moved out of the pockets 14 and are discharged into a receptacle (not shown) below the conveyor 15 (FIGURES 1, 2, 11 and 12). The apparatus comprises a vertically disposed plate 114 which is pivotally mounted at 115 on a bracket 116 extending from plate 42 of the frame 30. An operating rod 117 is slidably mounted in an apertured bracket 118 extending from the frame plate 41 and pivotally connected at its inner end to an arm 119 which extends from the trailing edge of the plate 114. When the operating rod 117 is pushed inwardly the plate 114 will swing about the pivot 115 and sweep across the top of the conveyor 15 so as to push the sausages in the conveyor pockets 14 out of the same. Successive sausages may be diverted out of the pockets 14 by leaving the plate 114 turned so that it extends diagonally across the path of the conveyor 15 as indicated in dotted line in FIGURE 1.

An apparatus 120 (FIGURES 1, 2, 13 and 14) for centering the sausages in the pockets 14 of the conveyor 15 is disposed along the conveyor 15. The centering apparatus 120 comprises a pair of oscillating plate members 121 and 122 which are mounted on opposite sides of the upper run of the conveyor 15 in generally vertical planes which converge in the direction of advance of the conveyor. The plates 121 and 122 are mounted at their leading ends on upstanding legs of lever forming angle members 123 and 124 (FIGURES 13 and 14) which are pivoted at 125 and 126 on opposite ends of a cross bar support 127, the latter being secured beneath a guiding and supporting member 128 for the upper run of the conveyor chains 86. The depending arms of the lever members 123 and 124 extend downwardly and inwardly toward each other with their ends terminating short of each other and carry pins 130 and 131 which project laterally therefrom and which have small rollers 130′ and 131′ engaging a toothed disc 132. The disc 132 is mounted on a longitudinally extending shaft 133 which is journaled in spaced bearing brackets 134 and 135 depending below the chain guide 128. The lower arms of the levers 123 and 124 are connected by a tension spring 136 to hold the rollers 130′ and 131′ against the peripheral surface of the toothed oscillating disc or wheel 132. At their trailing ends the plates 121 and 122 are mounted on an oscillating mechanism of the same construction as at the leading end and the elements thereof are indicated by the same numerals. The longitudinal shaft 133 carries a sprocket 137 at its leading end which is connected by drive chain 138 with a sprocket 139 on the drive shaft 95 outboard of the frame member 64.

At the leading end of the conveyor 15 (FIGURES 2, 5, 15 and 16) a pair of O-ring type belts 140 are mounted in laterally spaced relation on opposite sides of the conveyor 15 which are supported at their trailing ends on a pair of pulleys 141 on shaft members 142 wihch are journaled in the ends of parallel, elongate brackets 143 which are bolted or otherwise secured at their trailing ends on the cross beam 92. At their leading ends the belts 140 are carried on pulleys 144 (FIGURES 16 and 17) on the ends of a shaft 145 which is journaled in an upstanding post-like frame bracket member 146. The uppermost runs of the belts 140 are supported between the ends pulleys 141 and 144 by guide members 147 carried on cover plates 148 which are secured at their trailing ends to the cross beam 92.

The bracket post 146 also provides a support for mounting the conveyor assembly 16. The main frame of the conveyor assembly 16 (FIGURES 2, 5 and 15 to 18) comprises a pair of laterally spaced side plates 150 and 151 and connecting top and bottom plates 152 and 153. The frame thus formed is mounted on the pivot forming pulley shaft 145 with the shaft 145 being journaled in the side plates 150 and 151. A smaller sub-frame 154 is pivotally mounted on a cross shaft 155 which extends between the side plates 150 and 151 above and parallel with the shaft 145 in FIGURE 5. The sub-frame 154 (FIGURES 2, 5, 15 and 16) comprises a pair of laterally spaced side plates 156 and 157 connected by an H-shaped cross plate 158. The sub-frame 154 carries at its trailing end a transverse shaft 160 on which a pair of belt receiving pulleys 161 are mounted and which form the trailing end support for O-ring type belts 162, the latter being supported at their other ends on laterally spaced pulleys 163 which are provided on the ends of the cross shaft 155. The belts 162 are aligned vertically, when the frame 154 is in a horizontal position, with the belts 140 and co-operate therewith to advance the sausages beyond the end of conveyor 15 to the main conveyor section of the assembly 16. The conveyor frame 154 is provided with a combination operating linkage and lock arrangement which enables the operator to pivot the frame 154 upwardly about the pivot shaft 155 to an angle of approximately 45° relative to the horizontal where access to the sausages is provided so that any jamming may be relieved manually. The linkage comprises a pair of link members 165 and 166 which are pivotally connected to each other at 167 and which are connected by pivot pins 168 and 170 to a bracket 171 on the frame plate 158 and the upper end of an upstanding bifurcated post 172, respectively. The post 172 which is supported in upstanding relation on a cross plate 173 extending between the side frame members 150 and 151 is positioned relative to the bracket 171 so that the distance between the axes of the pivot pins 168 and 170 is somewhat less than the combined length of the linkage 165 and 166. The pivot pins 168 and 170 are connected by a pair of tension springs 174 which hold the links 165 and 166 in the position shown with the pivot 167 past dead center so as to lock the frame 154 in horizontal position. The link 166 is provided with arms extending at each end thereof and having finger pads or buttons 175 and 176 for operating the linkage 165 and 166 to raise and lower the frame 154. A stop member 177 is provided for limiting the downward movement of the link 165 toward the frame plate 157.

The main frame of the conveyor assembly 16 carries upper and lower O-ring type belt assemblies 180 and 181 which have opposed runs in vertically disposed, parallel horizontal planes when the frame is in the position shown in FIGURE 5 for advancing the sausages from the conveyor section 17 to the hopper 21 of the accumulator apparatus 20. The belt assemblies 180 and 181 which are of identical construction are supported at their trailing ends on the vertically disposed pivot shafts 145 and 155 and at their leading ends on cross shafts 182 and 183 extending between the side frame plates 150 and 151 in parallel relation and in vertical alignment when the conveyor frame is in horizontal position. The upper and lower belt assemblies 180 and 181 are of identical construction and only one will be described. The belt assembly 180 comprises two sets of parallel belt members 184 supported at their trailing ends on pulleys 185 which are arranged on the cross shaft 155 and at their leading ends on pulleys 186 which are supported on the cross shaft 182. The two sets of belts 184 and their supporting pulleys 185 and 186 are separated by an endless chain 187 which is supported on sprockets 188 and 190 mounted on the cross shafts 155 and 182, respectively. The belt assemblies 180 and 181 straddle the cross frame plates 152 and 153 and have their opposed runs supported on grooved plates 191 and 192 (FIGURE 18) on the frame cross plates 152 and 153 so as to grip the sausages between the belt assemblies 180 and 181 as the sausages advance between the belt end support pulleys. The cross shafts 145 and 155 at the trailing ends of the belt assemblies 180 and 181 are connected in driven relation by means of interengaging gears 193 and 194 (FIGURE 17) on the ends of these shafts. The lowermost shaft 145 carries a drive sprocket 195 which is connected by a drive chain 196 with a sprocket 197 on the drive shaft 90.

The conveyor assembly 16 has a cut-off mechanism for removing the small tips T at the ends of the sausages which remain on the ends of the sausages S after they are removed from the casing and delivered to the present apparatus. This mechanism is mounted on the side plates 150 and 151 at the leading end thereof and is indicated at 18. As these tip removers or trimmers are of identical construction except for being rights and lefts, only one of these mechanisms will be described.

The tip cutting or trimming mechanism 18 on the side plate 150 comprises a base plate or mounting plate 200 (FIGURES 19 to 22) which is mounted in a slot 201 in the end of the side plate 150. A guide plate 202 is secured on the inside face of the mounting plate 200 which has a tapered vertical surface 203 along which the ends of successive sausages are forced as they are advanced by the belt assemblies 180 and 181. An elongate slot 204 is located in the plate 202 to align approximately with the longitudinal axis of the sausage and as successive sausages are advanced opposite the slot the tip T springs into the slot 204 (FIGURE 20). A cutter wheel 205 having a pair of circumferentially spaced blades 206 is mounted on a shaft 207 which is journaled in a recess in the end of the mounting plate 200 so that the cutter wheel 205 revolves in a longitudinally extending, cylindrical compartment 208 alongside the leading end of the slot 204, the latter opening into the compartment 208 so as to place the tip T in the path of movement of a blade 206 where it is cut off by rotation of the wheel 205 and is ejected through the discharge slot 209. The cutter wheel shaft 207 extends into the gear box forming recess 211 in the mounting plate 200 with a beveled gear 212 on the end thereof engaging with the gear 213 on the end of the shaft 214 which is journaled in the bearing forming recess in the side wall of the mounting plate 200 and which carries at its outer end a gear 215 meshing with a drive gear 216 on a parallel shaft 217 above the shaft 214. The shaft 217 is journaled in a slotted portion of the mounting plate 200 adjacent the top edge thereof and carries a pinion gear 218 which meshes with drive gear 220 on the cross shaft 182 so that the tip cutting mechanism 18 is driven from the cross shaft 182. A corresponding tip cutting mechanism of the same construction at the opposite end of shaft 182 is arranged on the opposite side wall 151 of the conveyor assembly 16 and driven from the shaft 182 in the same manner.

The conveyor assembly 16 is in horizontal position as shown in FIGURE 5 when the entire apparatus is operating and delivers the sausages S from the conveyor 15 to the accumulator mechanism 20. The accumulator hopper 21 has an opening 221 adjacent the top of a downwardly inclined portion of the one end wall 222 (FIGURES 2 and 5) to permit passage of the sausages S from the conveyor assembly 16 into the upwardly opening, generally V-shaped compartment formed between downwardly inclined and converging portions of the end walls 222 and 223. The front and back side walls 224 and 225 are cut away adjacent the opening 221 to provide a seat for the ends of the side walls 150 and 151 of the conveyor assembly 16 so as to properly locate the assembly 16 in horizontal position for normal operation. Locking pins 226 are slidably mounted in guide bores provided at the ends of the side walls 150 and 151 and the hopper side walls 224 and 225 are provided with co-operating socket forming bores 227 for receiving the ends of manually movable pins 226 so as to lock the conveyor assembly 16 in operative position. When it is desired to discontinue the delivery of the sausages to the hopper 21 the locking pins 226 may be withdrawn from the sockets 227 and the entire conveyor assembly 16 may be swung downwardly about the pivot shaft 145 to a vertical position as illustrated in FIGURE 15 so as to disconnect the feed conveyor 16 and the hopper 21 and divert the flow of sausages to another receptacle (not shown).

The accumulator hopper 21 has a width or the distance between the front and back side plates 224 and 225 which is slightly greater than the length of the sausages and the front side wall or plate 224 is preferably of transparent material so that the operator can observe the level of the sausages accumulating in the hopper. The hopper is open at the top so that the sausages are accessible for the operator to manually relieve any jamming or crowding. The front wall 224 also has a hingedly mounted door 228. The hopper end walls 222 and 223 slope downwards toward the bottom of the hopper with their bottom edges being spaced to permit flow of the sausages into a restricted passageway or channel 230 through which the sausages are guided in a single line for discharge from the hopper 21 through a bottom discharge opening 231 onto the conveyor 23 in side-by-side relation. The channel 230 is formed in part between two sets of driven rollers 232 and 233 which are rotatably mounted on two spaced support brackets 234 and 235 secured between the hopper side walls 224 and 225 so as to provide between the sets of rollers a curved lower passageway forming the lower portion of the channel 230 through which passageway the sausages must pass to reach the opening 231. The channel 230 extends above the roller assemblies 232 and 233 and between a relatively large revolving roller member 236 of hexagonal cross section and a roller assembly 237 which is in the form of a cylindrical cage with a plurality of freely rotating smaller rollers mounted about the periphery thereof. The roller assembly 237 is positioned to rotate on an axis above the roller assembly 233 with its periphery spaced from the upper portion of the roller assembly 232 so as to leave a passageway between the same for the sausages. The hexagonal roller 236 is positioned between the roller assembly 234 and the bottom edge of the hopper end wall 222 opposite the roller assembly 237. The roller 236 and roller assembly 237 operate to assist the sausages into the channel 230 and to break up any bridging of the sausages as they move down between the end walls 222 and 223 and into the entrance to the channel 230. Oscillating plates 238 are mounted in a downwardly opening inverted V arrangement on a supporting shaft 239 between the side walls 224 and 225 which break up jams, limit the flow of sausages to the discharge channel 230 and assist in keeping the sausages properly oriented in the hopper.

The individual rollers in the channel forming roller assemblies 232 and 233, the hexagonal roller 236 and the roller assembly 237 of the accumulator mechanism 20 are driven from power shaft 240 (FIGURES 23 to 25) which is journaled in an upstanding support plate 241 in a gear box 242, the front face of which is formed by an upstanding plate 243 disposed parallel with the plate 241 and spaced therefrom. The shaft 240 carries a sprocket 244 between the plates 241 and 243 which is connected by a chain 245 with the drive sprocket of a suitable drive motor (not shown). The drive chain 245 also engages in driving relation with sprockets 246, 247 and 248 (FIGURE 23). Chain tension sprocket 246 is secured on stub shaft 250 which is journaled in the support plate 241. The sprocket 247 is secured on shaft 251 which carries the cylindrical roller assembly 237 and the sprocket 248 is secured on the shaft 252 of the hexagonal roller 236. A vertically extending link bar 253 is eccentrically connected at its lower end by pivot 254 to the end of shaft 251 outside the back plate 241 in which the shaft 251 is journaled and at its upper end the link 253 is pivoted at 255 to the free end of a rocker arm 256 extending from the rock shaft 239 on which the agitator plates 238 are supported.

The drive shaft 240 has a sprocket 257 on its rear end which is connected by a chain 258 with a sprocket 260 carried on the shaft 261, which has its rear end journaled in a U-shaped bracket 262 secured on the back face of the support plate 241. The shaft 261 which extends through the support plates 241 and 243 and the back wall 225 of the hopper 21 carries the lowermost roll 263 of the roll assembly 233 and also a small gear 264 which is integral with the roll 263 and which engages in driving relation with the large gear 265, the latter being mounted for rotation in the same direction but a slower speed on the middle roller 266 of the roller assembly 232 and engaging in driving relation with gears 267, 268, 269 and 270 which are integral with rollers 271, 272, 273 and 274, respectively, of the roller assembly 233. The gear 264 also engages in driving relation with small intermediate gear 275 which is mounted on stud shaft 276 and which engages with another small intermediate gear 277 on a stud shaft 278. The intermediate gear engages in driving relation with gears 279 and 280 which are integral with the lowermost rollers 281 and 282 of the roller assembly 232. The gear 280 engages in driving relation with intermediate gear 283 which is mounted on stud shaft 283' and which engages in driving relation with gears 284 and 285, the latter being integral with the topmost rollers 286 and 287 of the roller assembly 232. The large gear 265 which is rotatably mounted on roller 266 has a smaller integral gear 288 which engages in driving relation with gear 290. Gear 290 is integral with larger gear 291 and both of these gears rotate on shaft 261 in the same direction but at a lower speed. The large gear 291 engages in driving relation with gear 292 which is integral with roller 266 carried on the shaft 293. The shaft 293 extends through bearing sleeves in the support plates 241 and 243 and the end of the shaft 293 is journaled in the bracket 262. Extensions on the gears 269 and 270 abut against the bracket 262 to hold them in position axially. An extension on the gear 268 abuts against the back side of the gear 291 while gear 267 abuts against the back side of the gear 290. The gear 264 is retained on the shaft 261 by means of a snap ring behind the plate 241. Gears 280, 281, 284 and 285 abut against the back side of the gear 265. All of the small gears except 275, 277 and 283 are integral with rollers which extend through the support plates 241 and 243.

The hopper 21 has a manually operable slide 294 (FIGURE 5) mounted in a guide slot 295 in a supporting block member 296 at the base of the hopper which provides a gate for closing off the discharge opening 231 of the hopper to enable the operator to control the delivery of sausages to the conveyor 24.

The conveyor 24 (FIGURES 5 and 6) which receives the sausages from the discharge opening 231 in the bottom of the accumulator hopper 21 is supported on end sprockets 300 and 301 mounted on cross shafts 302 and 303 journaled at opposite ends of an upright, horizontally disposed supporting frame 304. The conveyor 24 comprises laterally spaced chains 305 carrying upwardly opening, relatively shallow pocket forming members 23 which are arranged in groups of a predetermined number in side-by-side relation with the groups separated by spacers 307. The upper run of the conveyor 24 is supported in a horizontal position on guide rails 308 with the trailing end of the conveyor traveling in a path beneath the hopper 21 and the leading end thereof advancing beneath the pick-up or transfer heads 26 on the group transfer apparatus 25 during a portion of the travel of the heads 26. The shaft 303 at the leading end of the conveyor 24 is driven by a chain and sprocket connection 309 to the packaging machine (not shown) in timed relationship.

The pick-up apparatus 25 (FIGURES 3, 6, 27, 28 and 29) comprises a horizontally disposed frame 310 which is formed primarily by vertically spaced upper and lower plates 311 and 312. The plates 311 and 312 are provided on their inner opposed faces with guideway forming grooves or recesses 313 and 314 which constitute tracks for receiving pairs of spaced top and bottom guide rollers 315 and 316 on the pick-up heads 26. The heads 26 are each pivotally mounted at 317 on an endless traveling chain 318 which is supported for movement in a horizontal path on sprockets 320, 321 and 322 which are mounted on vertical shafts 323, 324 and 325 arranged at the three corners of the triangular shaped frame 310. One of the chain carrying sprockets has its shaft 325 extended downwardly and connected in a suitable manner to the packaging machine (not shown) for rotating the same. The power connection is preferably with the driving mechanism for the infeed conveyor 28 of the wrapping machine so that the mechanism may be readily synchronized with the movement of the conveyor 28 in the pockets 326 on which the sausages S are deposited by operation of the transfer heads 26.

Each of the transfer heads 26 comprises a bar-like base 330 (FIGURES 3 and 27) having a triangular extension 331 which is provided with an aperture 332 for receiving the pivot 317 on the transporting conveyor 318. The bar 330 carries the pairs of guide rollers 315 and 316 at opposite ends thereof and on its top and bottom faces. The base 330 also carries pairs of supporting rollers 333 and 334 at opposite ends thereof adjacent the lower face which bear on the topmost surface of the lower plate 312 of the frame on opposite sides of the guide track 314. A head bracket 335 is secured on the outside face of the bar member 330 and is recessed to form a housing for a rack and pinion mechanism (FIGURE 28) for raising and lowering a suction pick-up assembly 336 which is mounted on a pair of vertically disposed post members 337 and 338. The post members 337 and 338 are slidably mounted in guideway forming bores 340 and 341 at opposite ends of the outside portion 342 of the bracket 335. The post members 337 and 338 have teeth cut in the surfaces thereof which oppose each other so as to form rack sections 343 and 344 which are engageable with a pair of pinions 345 and 346. The pinions 345 and 346 are mounted on small shafts 347 and 348 which are journaled in the housing forming bracket 335 and which are in engagement with each other and with the rack sections 343 and 344 on the posts 337 and 338. The one shaft 347 is extended into a recess 350 (FIGURE 27) at one end of the bracket and receives a beveled pinion 351 which is driven by a pinion 352 on a vertically disposed shaft 353 mounted in a bearing sleeve 354 in a vertical aperture in the bracket 335. A crank arm 355 is secured to the pinion 352 and carries at its free end a roller 356 which operates in a cam track 357 provided in the frame bottom plate 312 adjacent the guideway slot 314. The cam track 357 is arranged so as to turn the crank arm 355 and thereby rotate the elevating gears 345 and 346 to raise and lower the sausage pick-up assembly 336 at the proper time for pick up or deposit of the sausages.

The pick-up assembly 336 comprises a manifold forming member 358 which is secured on the bottom ends of elevating posts 337 and 338 and a pad supporting plate 360 on its bottom face with a plurality of spaced transverse slots or grooves 361 opening downwardly of the lower face for receiving suction pads 362. The suction pads are preferably of rubber and are provided with passageways 363 opening on their bottom surfaces and connected by passageways 364 in the manifolds 358 and 365. A flexible conduit or hose 366 connects the post member 337 with an air box 367 in the center of the frame 310. The air box 367 is mounted for rotation about a post 368 and provided with a sprocket 370 which is connected by the chain 371 with a driving sprocket 372 on the top of the one chain sprocket carrying shaft 325. Each conduit 366 provides a port or opening 373 in the bottom face of the box 367 which serves to connect the head successively, as the box 367 rotates, with a vacum port 374, an atmosphere port 375, and a compressed air port 376, all of which are provided as indicated in FIGURE 3 in the upper face of the base 377 on which the box 367 revolves. With this arrangement vacuum is applied to the head 26 for pick up of the sausages from conveyor 24, the vacuum is broken as the head reaches the position for discharge of the sausages onto conveyor 28 and thereafter air is blown through the head to keep the passages to the suction pads 362 free of any obstructions.

In using the apparatus, the link sausages S are delivered to the apparatus from casing stripping mechanisms in a plurality of parallel lanes or paths with the sausages advancing in the direction of their long axis and spaced at random in the respective lanes. Each delivery lane is in line with a conveyor unit 12 on the link receiving and transporting conveyor 10. The links are advanced on each conveyor unit 12 to a point adjacent the leading end where they are diverted into the compartments or passageways 13. The link controlling gates or bars 51 and 52 are reciprocated at regular intervals to permit passage of the sausages through the compartments 13 and into the pockets 14 of the cross conveyor 15. The cross conveyor 15 operates at a uniform speed and advances the links to the conveyor mechanism 16 and thence to the hopper 21 of the accumulator mechanism where a quantity of the links are accumulated in the bin forming top portion of the hopper. The links pass out of the bottom of the bin portion of the hopper and are guided into a single line by the rotating rollers which advance the links through the channel 230 and out of the discharge opening 231. The links leave the accumulator in a constant stream and are deposited in the pockets 23 on the constantly moving conveyor 24 which advances the links in group arrangement to a pick-up station along the one side of the group transfer device. The pick-up heads 26 are operated to pick up two groups of sausages at a time and carry them to a discharge point at the adjoining side of the triangular group transfer device where they are deposited in a feed conveyor for a wrapping machine. Since the links are delivered in random arrangement to the conveyor 10 they do not necessarily reach the accumulator 20 in a constant stream if all of the mechanism is operated constantly. The separate mechanisms are independently controlled so that the flow of sausages out of the accumulator may be temporarily stopped by closing the slide 294 to allow a quantity of the links to accumulate in the bin forming portion of the hopper and to control the delivery of the sausages to the conveyor 24. The advance of the sausages by the conveyor 15 may be interrupted by swinging the diverter plate 114 into sausage engaging position which discontinues the supply of sausages to the remainder of the apparatus when it is desirable to do so. Also, the conveyor assembly 16 may be pivoted to discontinue the sausages away from the accumulator 20 so as to interrupt the flow of the same.

I claim:

1. Apparatus for handling small elongate articles having the form of small sausages, said apparatus comprising a multiple lane traveling belt conveyor for advancing the articles in the direction of their longitudinal axes and in parallel paths, means forming a row of aligned open top compartments at the leading end of said conveyor, means for delivering the articles from the conveyor into said compartments, an endless traveling cross conveyor having a plurality of pocket forming members for receiving the articles in single row, side-by-side relation, said cross conveyor being disposed with its trailing end extending transversely of and beneath said row of compartments, means for controlling the discharge of articles from the compartments so as to deposit the articles in the pockets of said cross conveyor, an accumulator device comprising a hopper having a bin forming portion in the top thereof and a passageway therein which is defined by driven rollers for advancing the articles in single line side-by-side formation from the bottom of the bin portion to a bottom discharge opening in the hopper, means for transporting the articles from the cross conveyor to the bin portion of said accumulator hopper, an endless traveling conveyor having article receiving and grouping pockets which are arranged in side-by-side relation and in groups of a predetermined number, said article receiving and grouping conveyor having its trailing end disposed beneath said accumulator hopper for receiving in the pockets thereof the articles which are discharged from the bottom opening of the hopper, a transfer device comprising a frame having an endless conveyor member mounted thereon and traveling in a horizontal plane and a plurality of transfer heads attached to said conveyor member and extending outboard of the frame of said transfer device, said transfer heads traversing a path above the leading end of said article receiving and grouping conveyor, and said transfer heads having a reciprocating member mounted thereon which is operable to move down into engagement with a group of articles on said grouping conveyor and to pick up said group of articles for transfer from said conveyor.

2. Apparatus as recited in claim 1, and mechanism along said cross conveyor for centering the articles relative to the path of travel of said cross conveyor.

3. Apparatus for handling small elongate articles having the form of small sausages, said apparatus comprising a conveyor having parallel endless belts forming a plurality of parallel lanes for advancing a plurality of rows of the articles in the direction of their longitudinal axes and in parallel paths, means forming transversely aligned compartments at the end of said conveyor, means for directing the articles into said compartments, an endless traveling cross conveyor having a plurality of article accommodating pockets in single row, side-by-side relation, said cross conveyor being disposed with its trailing end extending transversely beneath said compartments, means for diverting articles from the conveyor belts so that the articles pass through said compartments and are deposited in the pockets of said cross conveyor, an accumulator device comprising a hopper having a bottom opening and a passageway therein which is defined by driven rollers for advancing the articles in single row, side-by-side relation to said bottom opening for discharge therefrom in a constant stream, conveyor means for advancing the articles from the cross conveyor to said accumulator hopper, an endless traveling group forming conveyor having pockets which are arranged in side-by-side relation and in groups of a predetermined number, said group forming conveyor having its trailing end disposed beneath said accumulator hopper for receiving articles which are discharged from the bottom opening of the hopper in the pockets thereof, a transfer device comprising a supporting frame of generally triangular shape having an endless conveyor member traveling in a horizontal plane and a plurality of transfer heads connected to said conveyor member by brackets which extend outboard of said supporting frame so as to travel in a path above the leading end of said group forming conveyor which extends along one side of said supporting frame, and said transfer heads having a vertically reciprocating gripper device operable to move down into engagement with one or more groups of articles on said grouping conveyor and to pick up the articles for transfer from said grouping conveyor to a discharge station along an adjoining side of said supporting frame.

4. Apparatus for handling small elongate articles having the form of small sausages which articles are delivered to the apparatus in parallel lines and random spacing, said apparatus comprising a conveyor having a plurality of traveling belts supported in parallel relation for advancing the articles in the direction of their longitudinal axes and in parallel paths, means forming article accommodating compartments at the ends of said belts, said compartments being arranged to form transversely aligned article passageways, an endless traveling cross conveyor having a plurality of pockets for advancing the articles in a single row and in parallel relation, said cross conveyor being disposed with its trailing end extending transversely of and beneath said compartments, means for controlling the movement of articles delivered to the compartments by the conveyor belts through the compartments so as to deposit the articles in the pockets of said cross conveyor, an accumulator device comprising a bin forming portion for receiving the articles in side-by-side relation, said bin forming portion having a bottom opening and a passageway which is defined by driven rollers for advancing the articles from said bin forming portion for discharge from said device in a single line and in side-by-side relation, conveyor means for transporting the articles from the cross conveyor to said accumulator hopper, an endless group forming conveyor having pockets which are arranged in side-by-side relation and in groups of a predetermined number, said group forming conveyor having its trailing end dosposed beneath said accumulator hopper for receiving in the pockets thereof the articles which are discharged from said hopper, a group transfer device comprising an upright supporting frame of generally triangular shape having an endles conveyor member traveling in a horizontal plane and a plurality of transfer heads attached to said conveyor member by brackets which extend outboard of said supporting frame, said supporting frame being arranged so that one side thereof extends along the leading end of said group forming conveyor, and said transfer heads having a carriage forming reciprocating member operable to move down into engagement with the group of articles on said group forming conveyor and to pick up a group of articles for transfer from said group forming conveyor to a discharge station along an adjoining side of said supporting frame.

5. Apparatus as recited in claim 4, and means operable to divert articles from the cross conveyor so as to interrupt the flow of articles to the accumulator device.

6. Apparatus for handling small elongate articles having the form of small sausages which are advanced to the apparatus in parallel lines and with random spacing, said apparatus comprising a plurality of traveling belt conveyors arranged in parallel relation for advancing the articles in the direction of their longitudinal axes and in parallel paths, means forming transversely aligned compartments at the ends of said belt conveyor into which the articles are delivered by the belt conveyors, an endless traveling cross conveyor having a plurality of pockets for receiving the articles in single line, parallel, side-by-side relation, said cross conveyor being disposed with a portion of its length extending transversely of and beneath said compartments, means for controlling the movement of articles delivered to the compartments so that the articles move through the compartments and are dropped into the pockets of said cross conveyor, an article centering device extending along said cross conveyor, an accumulator device comprising a hopper having a bottom opening and a passageway therein which is defined by driven rollers for advancing the articles to said bottom opening while arranging said articles in a single line for discharge therefrom, a pivotally mounted in-line conveyor for transporting the articles from the cross conveyor to said accumulator hopper, means for manually pivoting said in-line conveyor so as to divert the articles from the accumulator hopper and interrupt the flow of the articles, an endless traveling conveyor having a portion disposed beneath said accumulator hopper for receiving the articles which are discharged from the bottom opening of the hopper in a continuous stream and for advancing the articles to a group transfer device, said group transfer device comprising a supporting frame of generally triangular shape, an endless conveyor member mounted on said supporting frame and traveling in a horizontal plane and a plurality of transfer heads attached to said conveyor member and extending outboard of said supporting frame, said supporting frame being disposed so that the transfer heads travel in a path above the leading end of said last mentioned article receiving conveyor, and said transfer heads having a reciprocating member operable to move down into engagement with a group of articles on said last mentioned conveyor and suction means operable to pick up said group of articles for transfer to a discharge station along an adjoining side of said supporting frame.

7. Apparatus for handling small sausages comprising a traveling belt conveyor having multiple lanes for advancing the sausages in the direction of their logitudinal axis and in parallel paths, means forming transversely aligned compartments beneath said belt conveyor, an endless traveling cross conveyor having a plurality of pockets extending in the direction transversely of the movement of said cross conveyor for receiving the sausages in single line, parallel relation, said cross conveyor being disposed with a trailing portion thereof advancing in a transversely extending path beneath said compartments, means for guiding the sausages into the compartments, gate forming means at the bottom of the compartments which is operable to discharge the sausages from the compartments and to deposit the sausages in pockets of said cross conveyor, an accumulator device comprising a hopper having a bin forming portion and a plurality of driven rollers which are arranged to form a single line passageway from the bottom of the bin forming portion to a bottom discharge opening, conveyor means for transporting the sausages from the cross conveyor to said accumulator hopper, an endless traveling conveyor having upwardly opening pocket forming members which are arranged in side-by-side relation and in groups of a predetermined number, which group forming conveyor is disposed partially beneath said hopper so as to receive the sausages in a constant stream through the bottom opening, a transfer mechanism comprising a frame for supporting an endless traveling member for movement in a horizontal path having portions thereof at angles to each other, and a plurality of transfer heads spaced along said traveling member and extending outboard of the frame of said transfer device, said frame being positioned so that one portion of the path of the transfer heads extends parallel with and above the path of said group forming member, and said heads having means for picking up a group of sausages from said group forming conveyor and for depositing said sausages at a station in an adjoining angularly related portion of the path of said transfer heads.

8. Apparatus as recited in claim 7, and mechanism cooperating with said cross conveyor for centering the sausages relative to the path of advance of said cross conveyor.

9. Apparatus as recited in claim 7, and mechanism for trimming waste from the opposite ends of the respective sausages as they are advanced for deposit in said accumulator device.

10. Apparatus for conveying elongate articles having the general form of small sausages comprising a plurality of pairs of endless belts, the belts of each pair thereof being supported on spaced end pulleys which are disposed at different vertical levels so as to provide a generally horizontal article carrying run where the belts are side-by-side and a return run where the belts travel in a path diagonal relative to the horizontal path of the article carrying run with the belts being spread apart so as to straddle the article carrying run and an upwardly opening channel-like guideway forming member extending along said article carrying run, each pair of belts and its associated guideway forming member constituting a conveyor unit for a single line of articles and a plurality of said conveyor units being mounted in parallel relation on a support frame structure, said guideway forming member of each conveyor unit having side walls extending in parallel spaced relation along a portion of said article carrying run, and one of said side walls being offset at the leading end of the conveyor unit to provide an opening forming a passageway for movement therethrough of articles rolling off of the article conveying belt run, means forming an article accommodating compartment below each said opening, article diverting members at the leading end of the article carrying run of each conveyor unit for moving successive articles into the compartment, the compartments being aligned transversely and having gate members in the bottom ends thereof, a cross conveyor having a horizontal run extending beneath said compartments and provided with parallel pocket forming members for receiving articles from said compartments, and means to operate said gate members in timed relation to the movement of said cross conveyor thereby to collect into a single row articles delivered to said conveyor units in a plurality of lines and spaced at random in said lines.

11. Apparatus as recited in claim 10 and the gate members at the bottom of said compartments being mounted on reciprocating rods so as to open and close simultaneously.

12. A conveyor for handling elongate articles having the general form of small sausages comprising a plurality of pairs of endless belts each formed of O-ring type material, the belts of each pair thereof being arranged in parallel relation on spaced end pulleys which are supported at different vertical levels, the belts being arranged on the end pulleys so as to provide a generally horizontal article carrying run where the belts travel, in parallel, side-by-side relation and a return run where the belts travel in a path which extends diagonally relative to the horizontal path of the article carrying run from the top of the pulley at the leading end of the article carrying run to the bottom of the pulley at the trailing end thereof, the belts being spread apart between the pulleys on the return run so that the article carrying runs thereof pass between the return runs, an upwardly opening guideway forming member extending along said article carrying run, said guideway forming member having a U-shaped cross section with upwardly extending side walls, and one of said side walls terminating short of the end of the conveyor to provide a side opening passageway for movement of articles in a sidewise direction off of the article conveying belt run, and article diverting members at the leading end of the article carrying run of the belts for moving the articles off the conveyor.

13. A conveyor for handling elongate articles having the general form of small sausages comprising a plurality of pairs of endless belts, spaced end pulleys for supporting each pair of said belts, said end pulleys being disposed at different vertical levels so as to provide a generally horizontal article carrying run where the belts are in parallel, side-by-side relation and a return run from the top of the pulley at the leading end of the article carrying run to the bottom of the pulley at the trailing end thereof where the belts travel in a path which is diagonal relative to the horizontal path of the article carrying run with the belts being spread apart so as to straddle the article carrying run, and an upwardly opening channel forming guideway member extending along said article carrying run, said guideway member having laterally spaced side walls which are parallel along a major portion of said article carrying run, one of said side walls having a portion in an offset vertical plane at the leading end of the conveyor to provide a downwardly directed passageway for the articles when they are moved in a sidewise direction off of the leading end of the article carying belt run, and article diverting members at the leading end of the article carrying run of the belts for moving the articles into the passageway.

14. A conveyor for handling elongate articles having the general form of small sausages comprising a plurality of pairs of narrow endless traveling belts, spaced end pulleys for supporting each pair of said belts, said end pulleys being supported at different vertical levels so as to provide a generally horizontal article carrying run where the belts advance in parallel side-by-side relation and a return run where the belts travel from the top of the pulley at the leading end thereof to the bottom of the pulley at the trailing end thereof in a path which is diagonal relative to the horizontal path of the article carrying run and with the belts being spread apart between the pulleys so as to straddle the article carrying run, an upwardly opening guideway forming member of U-shaped section extending along said article carrying run, said guideway forming member having a portion of one side wall thereof in an offset vertical plane at the leading end of the conveyor and an opening in the bottom of the guideway along one side of said article carrying run, which opening provides a passageway for articles rolled off the side of said article conveying belt run, and article diverting means at the leading end of said article carrying run for causing the articles to roll off the belts and drop through said opening.

15. A conveyor for handling elongate articles having the general form of small sausages comprising a plurality of pairs of endless belts, each pair of said belts being carried on spaced end pulleys which are supported at different vertical levels so as to provide a generally horizontal article carrying run where the belts are side-by-side and a return run where the belts travel in a path which is diagonal relative to the horizontal path of the article carrying run with the belts being spread apart beween the pulleys so as to straddle the article carrying run and an upwardly opening guideway forming member of U-shaped section extending along said article carrying run, said guideway forming member having a portion of one side wall thereof in an offset vertical plane at the leading end of the conveyor to provide an opening in the bottom guideway along one side of said article carrying run, which opening provides a passageway for articles rolled off the side of said article conveying belt run, article diverting means at the leading end of said article carrying run for causing the articles to roll off the belts and drop through said opening, and laterally spaced rollers mounted between said end pulleys for guiding and supporting the return runs of the belts at the points where said return runs are spaced apart and straddle the article carrying runs thereof.

16. A conveyor for handling elongate articles having the general form of small sausages comprising a plurality of pairs of endless belts, each pair of said belts being carried on spaced end pulleys which are supported at different vertical levels so as to provide a generally horizontal article carrying run where the belts are side-by-side and a return run where the belts travel in a path which is diagonal relative to the horizontal path of the article carrying run and with the belts being spread apart between the pulleys so as to straddle the article carrying run and an upwardly opening guideway forming member of U-shaped section extending along said article carrying run, said guideway forming member having one side wall thereof in an offset vertical plane at the leading end of the conveyor so as to provide an opening in the bottom of the guideway along one side of said article carrying run, which opening provides a passageway for articles rolled off the side of said article conveying belt run, article diverting means at the leading end of said article carrying run for causing the articles to roll off the belts and drop through said opening, and wall forming plate members spaced below said guideway opening which form an article accommodating compartment, which plate members are movably mounted for confining the articles within the compartment in one position and for releasing the articles in another position.

17. In an apparatus for handling elongate articles of sausage-like form, a conveyor having pocket forming members extending transversely of the path of travel of the conveyor, means for delivering articles into the pocket forming members, and means for centering the articles relative to their path of travel which centering means comprises vertically disposed plates on opposite sides of the conveyor which converge in the direction of the leading end of the conveyor, said plates being spaced apart at their leading ends a distance corresponding to the length of the articles, and means to vibrate the plates so as to center articles in the conveyor pockets as they are advanced by the conveyor between the plates, said plate vibrating means comprising cross bar supports adjacent opposite ends of the plates, angle brackets pivoted on the ends of the cross bars and having upwardly extending arms on which said plates are mounted and downwardly extending arms having pins thereon engaging the periphery of a toothed wheel, and means to constantly rotate said toothed wheel.

18. In an apparatus of the type described, a pocketed conveyor for advancing small sausages positioned thereon in single row, side-by-side relation, an accumulator device and a pivotally mounted endless belt conveyor for receiving the sausages from the first conveyor and delivering them to the accumulator device when said belt conveyor is in a normal position, said belt conveyor being swingable to a position to divert the flow of sausages from the accumulator device, said pivotally mounted belt conveyor comprising a main frame and a subframe, said main frame supporting the upper and lower endless belt assemblies which are spaced to grip the sausages between oppositely disposed, parallel runs thereof, and a portion of the upper belt assembly being mounted on said subframe which subframe is pivoted for movement independently of the movement of the main frame for releasing the grip of the sausages by the belts at the entry end of said belt conveyor thereby interrupting the flow of sausages through said belt conveyor.

19. In an apparatus of the type described, a pocketed conveyor for advancing small sausages positioned thereon in single row, side-by-side relation, an accumulator device including a bin and a pivotally mounted endless belt conveyor extending between the leading end of the pocketed conveyor and the accumulator bin for receiving the sausages from the pocketed conveyor and delivering them to the accumulator device when said belt conveyor is in normal position, said belt conveyor being mounted so as to pivot to a position to divert the flow of sausages and interrupt delivery thereof to the accumulator device, said belt conveyor comprising a main frame and a subframe, said main frame supporting upper and lower endless belt assemblies which are spaced to grip the sausages between oppositely disposed parallel runs thereof, and a portion of the upper belt assembly being mounted on said subframe and movable to release the grip on the sausages thereby interrupting the flow thereof.

20. In an apparatus of the type described, a pocketed conveyor for advancing small sausages positioned thereon in single row, side-by-side relation with the long axes of the sausages extending transversely of the path of travel of the conveyor, an accumulator device including an accumulator bin spaced from the discharge end of said pocketed conveyor, an endless belt transfer conveyor normally positioned in generally horizontal relation between the leading end of the pocketed conveyor and the accumulator bin for receiving the sausages from the pocketed conveyor and delivering them to the accumulator bin, an elongate frame supporting said transfer conveyor, said transfer conveyor frame being pivotally mounted intermediate its ends so as to swing to a generally vertical position thereby allowing the sausages to fall free from the end of the pocketed conveyor and interrupting delivery thereof to the accumulator bin.

References Cited by the Examiner

UNITED STATES PATENTS

| | | | |
|---|---|---|---|
| 621,237 | 3/1899 | Fisher | 198—90 |
| 1,961,478 | 6/1934 | DeBack | 198—188 |
| 2,171,193 | 8/1939 | Ruau | 198—25 |
| 2,358,292 | 9/1944 | Malhiot | 198—131 |
| 2,429,071 | 10/1947 | Pirie | 198—30 |
| 2,435,762 | 2/1948 | Urschel | 146—81 |
| 2,751,059 | 6/1956 | Klein et al. | 198—34 |
| 2,765,897 | 10/1956 | Vamvakas et al. | 198—25 |
| 2,892,531 | 6/1959 | Hebert | 198—35 |
| 2,918,197 | 12/1959 | Ritscher et al. | 221—183 |
| 2,930,507 | 3/1960 | Pollmann | 221—183 |
| 3,045,733 | 7/1962 | Hoffmeister | 146—81 |
| 3,101,475 | 8/1963 | Peterson | 198—84 |

J. SPENCER OVERHOLSER, *Primary Examiner.*

UNITED STATES PATENT OFFICE
CERTIFICATE OF CORRECTION

Patent No. 3,217,766                      November 16, 1965

Andrew H. Vedvik

It is hereby certified that error appears in the above numbered patent requiring correction and that the said Letters Patent should read as corrected below.

Column 1, line 16, after "to" insert -- an --; column 2, line 30, for "steam" read -- stream --; column 4, line 20, for "on" read -- of --; column 5, line 49, before "mounted" insert -- are --; column 7, line 5, for "wihch" read -- which --; line 13, for "ends" read -- end --; column 12, line 12, after "365" insert -- in the one post member 337 --; line 20, for "vacum" read -- vacuum --; column 14, line 41, for "dosposed" read -- disposed --; column 15, line 34, for "logitudinal" read -- longitudinal --; column 16, line 20, for "support" read -- supporting --.

Signed and sealed this 18th day of October 1966.

(SEAL)

Attest:

ERNEST W. SWIDER
Attesting Officer

EDWARD J. BRENNER
Commissioner of Patents